US00RE49300E

(19) United States
(12) Reissued Patent
Jung et al.

(10) Patent Number: US RE49,300 E
(45) Date of Reissued Patent: Nov. 15, 2022

(54) NON-CONTACT CHARGING STATION WITH POWER TRANSMISSION PLANAR SPIRAL CORE, NON-CONTACT POWER-RECEIVING APPARATUS, AND METHOD FOR CONTROLLING THE SAME

(71) Applicant: GE HYBRID TECHNOLOGIES, LLC, Niskayuna, NY (US)

(72) Inventors: Chun-Kil Jung, Seoul (KR); Yoon-Sang Kook, Gwacheon-si (KR)

(73) Assignee: GE HYBRID TECHNOLOGIES, LLC

(21) Appl. No.: 15/802,373

(22) Filed: Nov. 2, 2017

Related U.S. Patent Documents

Reissue of:
(64) Patent No.: 9,178,376
Issued: Nov. 3, 2015
Appl. No.: 12/674,948
PCT Filed: Apr. 17, 2009
PCT No.: PCT/KR2009/002003
§ 371 (c)(1),
(2) Date: Feb. 24, 2010
PCT Pub. No.: WO2010/067927
PCT Pub. Date: Jun. 17, 2010

(30) Foreign Application Priority Data

Dec. 12, 2008 (KR) ..... 10-2008-0126270
Dec. 22, 2008 (KR) ..... 10-2008-0131043
Dec. 22, 2008 (KR) ..... 10-2008-0131328

(51) Int. Cl.
*H01F 27/36* (2006.01)
*H01F 27/28* (2006.01)
(Continued)

(52) U.S. Cl.
CPC ..... *H02J 7/0014* (2013.01); *H01M 10/44* (2013.01); *H02J 7/007* (2013.01); *H02J 7/0016* (2013.01);
(Continued)

(58) Field of Classification Search
CPC .... H02J 7/025; H01F 27/2804; H01F 27/365; H01F 38/14
See application file for complete search history.

(56) References Cited

U.S. PATENT DOCUMENTS 6,040,680 A * 3/2000 Toya et al. ..... 320/108
6,316,909 B1 11/2001 Honda et al.
(Continued)

FOREIGN PATENT DOCUMENTS

JP 3-215134 9/1991
JP 05-128324 5/1993
(Continued)

OTHER PUBLICATIONS

Non-Final Office Action issued to U.S. Appl. No. 12/674,948 dated Jun. 27, 2012.
(Continued)

*Primary Examiner* — Linh M Nguyen
(74) *Attorney, Agent, or Firm* — Delizio, Peacock, Lewin & Guerra, PLLC; John F. Guerra

(57) ABSTRACT

A non-contact charging station with a planar-spiral power transmission core, a non-contact power-receiving apparatus, and a method for controlling the same. A primary core of the non-contact charging station transmitting a power signal to a portable device using an induced magnetic field and a secondary core of the non-contact power-receiving apparatus are configured as a power transmission Printed Circuit Board (PCB) core in which a planar-spiral core structure is formed on a core base. The power transmission PCB core has a simplified shape along with improved applicability that facilitates its mounting on a non-contact charger. In addition, the receiving core has a reduced volume to reduce the entire size of the power-receiving apparatus so that it can be easily mounted onto a portable device.

24 Claims, 14 Drawing Sheets

(51) Int. Cl.

| | |
|---|---|
| ***H01F 38/14*** | (2006.01) |
| ***H02J 7/00*** | (2006.01) |
| ***H01M 10/44*** | (2006.01) |
| *H01M 10/42* | (2006.01) |

(52) U.S. Cl.

CPC ..... *H02J 7/0019* (2013.01); *H02J 7/0026* (2013.01); *H01M 2010/4271* (2013.01); *H01M 2010/4278* (2013.01); *Y02T 10/70* (2013.01)

(56) References Cited

U.S. PATENT DOCUMENTS

| | | | | |
|---|---|---|---|---|
| 6,803,744 | B1 | 10/2004 | Sabo | |
| 7,107,103 | B2 | 9/2006 | Schulman et al. | |
| 7,239,110 | B2 | 7/2007 | Cheng et al. | |
| 7,310,245 | B2 | 12/2007 | Ohbo | |
| 7,514,818 | B2 | 4/2009 | Abe et al. | |
| 7,521,890 | B2 | 4/2009 | Lee et al. | |
| 7,791,312 | B2 * | 9/2010 | Kook | H02J 7/0044 320/108 |
| 7,804,197 | B2 | 9/2010 | Iisaka et al. | |
| 7,880,337 | B2 | 2/2011 | Farkas | |
| 7,880,338 | B2 | 2/2011 | Jin | |
| 7,907,043 | B2 | 3/2011 | Mori | 336/200 |
| 7,915,858 | B2 | 3/2011 | Liu et al. | |
| 7,956,495 | B2 | 6/2011 | Jin | |
| 3,030,887 | A1 | 10/2011 | Jung | |
| 8,064,825 | B2 | 11/2011 | Onishi et al. | |
| 8,102,147 | B2 | 1/2012 | Jung | |
| 8,159,183 | B2 | 4/2012 | Choi et al. | |
| 8,169,185 | B2 * | 5/2012 | Partovi et al. | 320/108 |
| 8,310,107 | B2 | 11/2012 | Jin | |
| 8,421,407 | B2 | 4/2013 | Johnson | |
| 8,558,410 | B2 | 10/2013 | Itkonen | |
| 8,587,154 | B2 | 11/2013 | Fells et al. | |
| 8,653,698 | B2 | 2/2014 | Baarman et al. | |
| 8,766,488 | B2 | 7/2014 | Azancot et al. | |
| 8,847,546 | B2 | 9/2014 | Baarman et al. | |
| 8,917,057 | B2 | 12/2014 | Hui | |
| 9,099,894 | B2 | 8/2015 | Azancot et al. | |
| 9,106,203 | B2 | 8/2015 | Kesler et al. | |
| 9,130,395 | B2 | 9/2015 | Jung | |
| 9,178,376 | B2 | 11/2015 | Jung et al. | |
| 9,356,473 | B2 | 5/2016 | Ghovanloo | |
| 9,368,976 | B2 | 6/2016 | Baarman | |
| 9,544,022 | B2 | 1/2017 | Stevens et al. | |
| 9,577,437 | B2 | 2/2017 | Fells et al. | |
| 2002/0003980 | A1 * | 1/2002 | Takano et al. | 399/320 |
| 2002/0014938 | A1 * | 2/2002 | Westphal et al. | 335/301 |
| 2004/0145342 | A1 * | 7/2004 | Lyon | 320/108 |
| 2005/0068019 | A1 | 3/2005 | Nakamura et al. | 323/355 |
| 2006/0080825 | A1 * | 4/2006 | Pille | 29/592 |
| 2006/0145660 | A1 * | 7/2006 | Black et al. | 320/108 |
| 2006/0202665 | A1 * | 9/2006 | Hsu | 320/139 |
| 2006/0251203 | A1 * | 11/2006 | Okamura et al. | 376/287 |
| 2007/0044370 | A1 | 3/2007 | Shoji | 43/44.98 |
| 2008/0061733 | A1 | 3/2008 | Toya | 320/103 |
| 2008/0067874 | A1 | 3/2008 | Tseng | 307/104 |
| 2008/0111518 | A1 * | 5/2008 | Toya | 320/108 |
| 2008/0197802 | A1 | 8/2008 | Onishi et al. | 320/106 |
| 2008/0205919 | A1 * | 8/2008 | Takagi | 399/50 |
| 2008/0224656 | A1 | 9/2008 | Schulz | 320/108 |
| 2008/0278112 | A1 | 11/2008 | Hui et al. | 320/108 |
| 2009/0001941 | A1 | 1/2009 | Hsu et al. | |
| 2009/0075068 | A1 * | 3/2009 | Pyo | B32B 15/08 428/336 |
| 2009/0146608 | A1 | 6/2009 | Lee | |
| 2009/0267558 | A1 * | 10/2009 | Jung | 320/108 |
| 2009/0290332 | A1 * | 11/2009 | Jacobs et al. | 362/183 |
| 2010/0314946 | A1 | 12/2010 | Budde et al. | |

FOREIGN PATENT DOCUMENTS

| | | | |
|---|---|---|---|
| JP | 05-128324 | A | 5/1993 |
| JP | 10-14139 | | 1/1998 |
| JP | 11-289692 | | 10/1999 |
| JP | 2001-274527 | | 10/2001 |
| JP | 2002-10535 | A | 1/2002 |
| JP | 2005006440 | | 1/2005 |
| JP | 2005-110399 | A | 4/2005 |
| JP | 2005-110421 | A | 4/2005 |
| JP | 2006-246633 | A | 9/2006 |
| JP | 2006-282473 | | 10/2006 |
| JP | 3877568 | | 2/2007 |
| JP | 2007336717 | | 12/2007 |
| KR | 20-0357251 | | 7/2004 |
| KR | 20-0357251 | Y1 | 7/2004 |
| KR | 10-2008-0012782 | | 2/2008 |
| KR | 10-2008-0012782 | A | 2/2008 |
| KR | 10-0836631 | | 6/2008 |
| KR | 10-0836631 | B1 | 6/2008 |
| KR | 10-2008-0081480 | | 9/2008 |
| WO | 2006001557 | | 1/2006 |
| WO | 2008016273 | | 2/2008 |
| WO | WO 2008/050917 | | 5/2008 |
| WO | WO 2008/137996 | | 11/2008 |

OTHER PUBLICATIONS

Non-Final Office Action issued to U.S. Appl. No. 12/674,948 dated Jan. 10, 2013.

Office Action issued by SIPO dated Aug. 5, 2014 for the corresponding Chinese Application No. 201310042301.6.

Office Action issued by the USPTO dated Apr. 21, 2014 for the corresponding U.S. Appl. No. 12/674,948.

Office Action issued by the USPTO dated Nov. 19, 2013 for the corresponding U.S. Appl. No. 12/674,948.

U.S. Appl. No. 12/674,948, filed Feb. 24, 2010, Chun-Kil Jung, Spacon Co., LTD.

U.S. Appl. No. 12/674,948, filed Feb. 24, 2010, Jung, Chun-Kil Jung.

"Wireless Power", by David Baarman in Appliance Design, Sep. 2006, p. 36 (Retrieved from ProQuest Technology Collection).

Office Action issued by JPO dated Feb. 24, 2015 for the corresponding JP Application No. 2013-191812.

Office Action issued by the USPTO dated Dec. 8, 2014 for the corresponding U.S. Appl. No. 13/344,741.

Office Action issued by JPO dated Sep. 24, 2014 for the corresponding Japanese Application No. 2013-191812.

Non-Final Office Action issued to U.S. Appl. No. 13/344,741 dated Jun. 27, 2012.

Final Office Action issued to U.S. Appl. No. 13/344,741 dated Jan. 18, 2013.

Final Office Action issued to U.S. Appl. No. 13/344,741 dated Jun. 3, 2014.

Supplementary European Search Report dated Sep. 30, 2013, issued in corresponding European Patent Application No. 09 808 926.1.

"Chinese Application No. 200980100248.2 First Office Action", dated Apr. 27, 2012, 6 pages.

"Chinese Application No. 201310042301.6 Second Office Action", dated Mar. 24, 2015, 4 pages.

"Chinese Application No. 201310042301.6 Third Office Action", dated Sep. 18, 2015, 4 pages.

"European Application No. 09808926 Communication pursuant to Article 94(3) EPC", dated Jun. 12, 2014, 3 pages.

"European Applcation No. 09808926 Communication pursuant to Article 94(3) EPC", dated Jun. 17, 2016, 3 pages.

"European Applcation No. 09808926 Communication pursuant to Article 94(3) EPC", dated Sep. 26, 2016, 3 pages.

"Japanese Application No. 2011540588 Notification of Reason for Refusal", dated May 14, 2013, 7 pages.

"Japanese Application No. 2013191812 Notification of Reason for Refusal", dated Sep. 15, 2015, 3 pages.

"Korean Application No. 10-2008-0126270 Notification of Reason for Refusal", dated Aug. 21, 2009, 2 pages.

"Korean Application No. 10-2008-0131043 Notification of Reason for Refusal", dated May 22, 2009, 3 pages.

"PCT Application No. PCT/KR2009/002003 International Preliminary Report on Patentability", dated Jul. 5, 2011, 8 pages.

(56) References Cited

OTHER PUBLICATIONS

"PCT Application No. PCT/KR2009/002003 International Search Report and Written Opinion", dated Jan. 11, 2010, 9 pages.
"U.S. Appl. No. 12/674,948 Final Office Action", dated Apr. 14, 2015, 15 pages.
"U.S. Appl. No. 12/674,948 Final Office Action", dated Aug. 26, 2014, 12 pages.
"U.S. Appl. No. 12/674,948 Office Action", dated Dec. 24, 2014, 13 pages.
"U.S. Appl. No. 12/674,948 Office Action", dated Apr. 23, 2013, 9 pages.
"U.S. Appl. No. 13/344,741 Final Office Action", dated Sep. 12, 2013, 10 pages.
"U.S. Appl. No. 13/344,741 Office Action", dated Jan. 13, 2014, 10 pages.
"U.S. Appl. No. 13/344,741 Office Action", dated Apr. 25, 2013, 8 pages.
"U.S. Appl. No. 13/344,741 Office Action", dated Aug. 27, 2014, 10 pages.
Baarman, "Wireless Power", Appliance Design; Sep. 2006, vol. 54, Issue 9, pp. 36-38,40,43, ProQuest Technology Collection, Sep. 2006, 5 pages.
Kurschner, et al., "Contactless Energy Transmission Systems with Improved Coil Positioning Flexibility for High Power Applications", Published in: Power Electronics Specialists Conference, 2008. PESC 2008. IEEE, Date of Conference: Jun. 15-19, 2008, Aug. 8, 2008.
Japanese Office Action dated Jan. 8, 2013, issued in corresponding Japanese Application No. 2011-540588.

* cited by examiner

NON-CONTACT CHARGING STATION WITH POWER TRANSMISSION PLANAR SPIRAL CORE, NON-CONTACT POWER-RECEIVING APPARATUS, AND METHOD FOR CONTROLLING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to a non-contact charging station with a planar-spiral power transmission core, a non-contact power-receiving apparatus, and a method for controlling the same. More particularly, a primary side core of the non-contact charging station transmitting a power signal to a portable device using an induced magnetic field is configured as a power transmission Printed Circuit Board (PCB) core in which a planar-spiral core structure is formed on a core base. The power transmission PCB core has a simplified shape along with improved applicability that facilitates its mounting on a non-contact charger. In addition, the receiving core has a reduced volume to reduce the entire size of the power-receiving apparatus so that it can be easily mounted onto a portable device.

BACKGROUND ART

In general, portable devices, such as a cellular phone, a Personal Digital Assistant (PDA), a Portable Media Player (PMP), a Digital Multimedia Broadcasting (DMB) terminal, an MPEG-1 audio layer-3 (MP3) player and a notebook computer, cannot be kept plugged into a regular power source at home or in an office since they are used while users are moving. Accordingly, such a portable device is equipped with a disposable battery (i.e., a primary battery) or a rechargeable battery (i.e., a secondary battery). In the case of recharging electric power, supplied from a regular power source, to the battery or a battery pack of the portable device, a method of supplying the electric power to the portable device via power supply lines or power supply connectors has traditionally been used.

However, in the case where the electric power is supplied to the portable device via the connectors, an instant discharge may happen from the connectors due to a potential difference between the connectors of a charger and the battery when the charger and the battery are connected to or disconnected from each other.

The instantaneous discharge may cause impurities to accumulate on both the connectors, thus resulting in a fire hazard.

In addition, since the connectors are directly exposed to the air, moisture or dust adheres to the connectors, thereby causing a natural discharge. As a result, the lifetime and performance of the charger and the battery may deteriorate.

In order to overcome problems related to the method of supplying electric power via the connectors, non-contact chargers have been developed. When a terminal containing a battery to be charged is placed on the primary coil of a charger, a secondary coil of a battery is charged. In this case, electric power is charged by inducing an electromotive force on the secondary coil using a magnetic field generated from the primary coil.

However, the non-contact charger of the related art can merely supply electric power to the portable device and its use is limited since it is not used for other applications.

The magnetic field generated from the primary coil changes when a metal body is placed inside it. Then, a considerable amount of power loss, which may damage the non-contact charger, occurs in the primary coil.

Since an excessive current flowing through the secondary coil and the circuit of the battery pack generates heat, the battery pack may explode due to excessive heat.

Furthermore, since most of the primary and secondary cores are implemented with one thick coil (hereinafter, referred to as a "Litz coil") formed by twisting a number of fine wires, a great amount of coil materials are consumed and the charger becomes bulky. The charger then has a complicated structure and is difficult to manufacture. Mounting the charger on the portable device is often difficult because the portable device contains a number of semiconductor elements and the battery pack. Moreover, heat or a magnetic field may interfere with a plurality of controllers and members, thereby causing them to malfunction.

In addition, the charger is not applicable to a variety of technical fields since it is not easily manufactured in a variety of shapes. For example, one battery pack is not commonly used since the battery pack of the portable device such as a portable phone, a PDA, a PMP, a DMB terminal, an MP3 player, and a notebook computer has connectors installed in different places according to applications and manufacturers.

Since the non-contact charger of the related art also uses a thick coil, the charger is bulky, has a complicated structure, and is difficult to manufacture.

Moreover, the non-contact charger has limited applications since it is not easily manufactured in a variety of shapes. If the battery pack moves while being charged, power transmission is not properly achieved and thus transmission efficiency degrades.

DISCLOSURE

Technical Problem

The present invention has been made to solve the foregoing problems with the prior art, and embodiments of the present invention provide a non-contact charging station with a planar-spiral power transmission core, a non-contact power-receiving apparatus, and a method for controlling the same, in which a primary core of the non-contact charging station transmitting a power signal using an induced magnetic field toward a portable device is configured as a planar-spiral power transmission Printed Circuit Board (PCB) core to simplify its shape, so that applicability to a non-contact charger and the like can be improved.

Embodiments of the present invention also provide a non-contact charging station with a planar-spiral power transmission core, a non-contact power-receiving apparatus, and a method for controlling the same, in which the primary core can have a double-layer structure due to its planar-spiral power transmission PCB structure and the diversity of this structure makes it possible to ensure an efficient charging operation, thereby stably charging the portable device, even if the portable device is displaced.

Embodiments of the present invention also provides a non-contact charging station with a planar-spiral power transmission core, a non-contact power-receiving apparatus, and a method for controlling the same, in which the primary core is configured, in particular, with a plurality of thin power transmission PCB cores, each of which is respectively controlled to operate, so that power can be stably transmitted to the portable device through a power transmission control algorithm even if the portable device is displaced from a position corresponding to one core to a position corresponding to another core (for example, even if the portable device is displaced from a core on which the portable device was being charged).

Embodiments of the present invention can minimize the volume of a secondary power-receiving core of the non-contact power-receiving apparatus by configuring it as a planar-spiral power transmission PCB core, thereby minimizing the entire size of the portable device as well as improving the characteristic of the non-contact power-receiving apparatus to be mounted on the portable device.

Embodiments of the present invention also provides a non-contact charging station with a planar-spiral power transmission core, a non-contact power-receiving apparatus, and a method for controlling the same, in which manufacturing is facilitated and power-receiving characteristics are improved since the power transmission core is formed in a planar shape on a PCB.

Moreover, embodiments of the present invention can provide one non-contact power-receiving apparatus with a plurality of connectors, so that the non-contact power-receiving apparatus can be applied to various types of portable devices using one battery pack.

Technical Solution

According to an aspect of the present invention, there is provided a non-contact charging station for generating an induced magnetic field toward a non-contact power-receiving apparatus for power charge and data transmission. The non-contact charging station may include a transmission controller provided inside the non-contact charging station, for controlling power transmission and data transmission/reception; and a station part electrically connected with the transmission controller, generating the induced magnetic field, and placing the non-contact power-receiving apparatus on top thereof. The station part includes a primary core generating the induced magnetic field, the primary core has an inductance pattern core on a core base, which is fastened to the station part, and the inductance pattern core includes a power transmission PCB core having a planar-spiral core structure.

According to another aspect of the present invention, there is provided a method of controlling a non-contact charging station, wherein non-contact charging station includes a power transmission PCB core having a planar-spiral core structure. The method may include steps of:

transmitting, at a primary core, a unique identification request signal to the non-contact power-receiving apparatus under control of a transmission controller;

detecting and processing, at a received signal processor, a unique identification signal transmitted from the non-contact power-receiving apparatus in response to the unique identification request signal;

transferring the signal detected by the received signal processor to the transmission controller, and determining from which one of first upper, second upper and lower cores the detected signal is from;

transmitting a switch control signal to a state controller block, the switch control signal allowing the determined one of the cores to be switched on; and transmitting a power transmission control signal along with the switch control signal toward the pre-driver so that the switched-on core is applied with electric power to generate an induced magnetic field.

According to a further aspect of the present invention, there is provided a non-contact charging station for generating an induced magnetic field toward a non-contact power-receiving apparatus for power charge and data transmission. The non-contact charging station may include a transmission controller provided inside the non-contact charging station, for controlling power transmission and data transmission/reception; and a station part enclosing a primary core electrically connected with the transmission controller to generate the induced magnetic field, and placing the non-contact power-receiving apparatus on top thereof. The primary core has an inductance pattern core on a core base, which is provided to the station part, the induction pattern core includes a power transmission PCB core having a planar-spiral core structure based on a planar unit core in which a plurality of fine coil threads are formed in a lateral direction to be parallel, and the induction pattern core includes first and second planar coils on top of the core base.

According to yet another aspect of the present invention, there is provided a non-contact power-receiving apparatus, in which a secondary core receives a power signal caused by an induced magnetic field generated from a non-contact charging station, so that electric power is charged to a battery cell under control of a battery pack controller and charged power is supplied to a portable device. The non-contact power-receiving apparatus may include the second core provided on top of the battery cell; a charging PCB having the battery pack controller and provided on a front or side edge of the battery cell; and a terminal connector provided in the charging printed circuit on the front or side edge of the battery cell, and allowing electric power to be supplied to the portable device via connector contact, wherein the terminal connector includes a central connector arranged in a central portion, a left connector arranged in left, and a right connector arranged in right; a rectifier block connected with the secondary core to rectify an induced current; a battery pack controller processing data transmitted/received by the secondary core; a charge circuit block allowing electric power supplied from the rectifier block to be charged to the battery cell under control of the battery pack controller; and a charge monitor circuit block monitoring a level of charge of the battery cell and transmitting a signal notifying that the battery cell is fully charged or is discharged to the battery pack controller, wherein the rectifier block, the battery pack controller, the charge circuit block, and charge monitor circuit block are provided on the charge PCB.

Advantageous Effects

In accordance with embodiments of the present invention as set forth above, the non-contact charging station is simple in shape since the primary core transmitting a power signal using an induced magnetic field toward a portable device is configured as a planar-spiral power transmission PCB core. Thus, the non-contact charging station can be easily mounted on a non-contact charger, thereby achieving a remarkable effect of improved applicability.

The primary core can be configured as a single-layer or multiple-layer structure since it is a thin power transmission PCB core instead of a Litz core. This as a result can ensure a portable device to be constantly and stably charged even if it is displaced to any position.

In particular, power transmission can be improved by stably transmitting power through a power transmission control algorithm even if the non-contact power-receiving apparatus provided to the portable device is displaced due to shaking while being charged.

In addition, since the secondary power-receiving core of the non-contact power-receiving apparatus is configured as a planar-spiral power transmission PCB core, the volume of the secondary power-receiving core can be minimized This as a result can minimize the entire size of the portable device and improve the characteristic of the non-contact power-receiving apparatus to be mounted on the portable device.

In particular, since the power transmission core is formed in a planar shape on a PCB, manufacturing is facilitated and power-receiving characteristics are improved as advantageous effects.

Furthermore, the shielding section of the secondary core of the non-contact power-receiving apparatus can shield radio power signals in order to guarantee the operational performance of other electronic elements mounted on the non-contact power-receiving apparatus. As a result, the reliability and security of a product can be improved, and power can be stably charged.

Moreover, the non-contact power-receiving apparatus can be applied to various types of portable devices using one battery pack since the terminal connector assembly of the non-contact power-receiving apparatus includes a plurality of connectors. As advantageous effects, the generality and compatibility of a product can be improved.

DESCRIPTION OF DRAWINGS

The above and other objects, features and other advantages of the present invention will be more clearly understood from the following detailed description taken in conjunction with the accompanying drawings, in which.

BEST MODE

A non-contact charging station having a planar-conical power transmission core, a non-contact power-receiving apparatus, and a method for controlling the same in accordance with the present invention will now be described more fully with reference to the accompanying drawings, in which exemplary embodiments thereof are shown. The present invention may, however, be embodied in many different forms.

Figure 1:
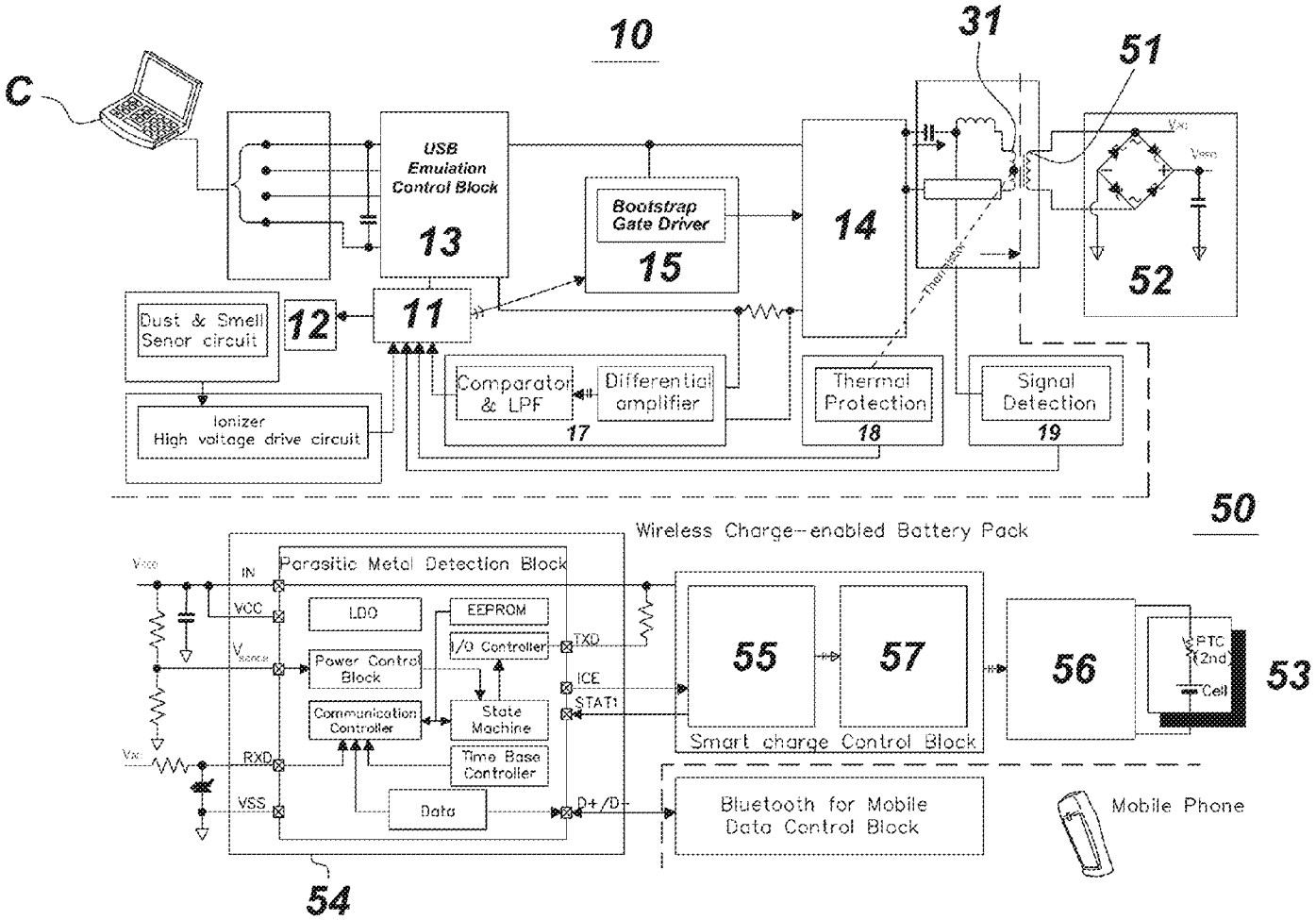
FIG. 1 is a block diagram illustrating a non-contact charging station and a non-contact power-receiving apparatus in accordance with one exemplary embodiment of the present invention.

Referring to FIG. 1, when a power signal occurs due to an induced magnetic field from a primary core 31 of a non-contact charging station 10 of the present invention, a secondary core 51 of a non-contact power-receiving apparatus charges a battery or cell 53 by receiving the power signal.

For this, the non-contact charging station 10 includes, therein, a transmission controller 11 transmitting electric power and transmitting and receiving data, and a station part 30 including a primary core 31 electrically connected with the transmission controller 11 to generate an induced magnetic field. A power supply part 13 is provided, which receives electric power from an external power source, and supplies the electric power to each member (i.e., electronic elements, etc.) of the non-contact charging station 10 and to the primary core 31 to generate an induced magnetic field therefrom. Here, the power supply part 13 can be configured to perform data communication with an external device (e.g., a computer C in FIG. 1).

The non-contact charging station 10 also includes a resonant converter 14 supplying electric power from the power supply part 13 to the primary core part 31, a pre-driver 15 transmitting an oscillation signal to the resonant converter 14 under the control of the transmission controller 11, and the like. The pre-driver 15 supplies electric power from the power supply part 13 to the primary core part 31 by driving the resonant converter 14 in response to the oscillation signal transmitted from the transmission controller 11.

In addition, a station memory 12 stores processing and its results on the internal operation of the non-contact charging station 10 in accordance with the present invention.

The non-contact charging station 10 also includes a received signal processor 19 connected with the primary core 31. The received signal processor 19 processes a signal transmitted from the non-contact power-receiving apparatus 50 to transmit the processed signal to the transmission controller 11. The received signal processor 19 will be described in more detail later.

Furthermore, a case (not shown) of the non-contact charging station 10 can be additionally provided with a variety of means for additional functions, including a power on/off switch to start/stop operation, an input panel for signal input, a non-contact charging plate acting as the station part 30, and a display unit such as an Liquid Crystal Panel (LCD) and Light Emitting Diodes (LEDs) displaying a charged state in the non-contact power-receiving apparatus 50.

Accordingly, when a portable device such as a cellular phone, a Personal Digital Assistant (PDA), a Portable Media Player (PMP), a Digital Multimedia Broadcasting (DMB) terminal, an MPEG-1 audio layer-3 (MP3) player and a notebook computer, or the non-contact power-receiving apparatus 50 such as a detachable battery pack mounted on the portable device is placed on the charging plate, i.e., the station part 30 of the non-contact charging station 10, the received signal processor 19 processes signals transmitted from the non-contact power-receiving apparatus 50 and transmits the processed signals to the transmission controller 11, and the transmission controller performs a charging operation so that the non-contact power-receiving apparatus 50 can be charged.

External electric power supplied to the power supply part 13 of the non-contact charging station 10 is supplied via a Universal Serial Bus (USB) port, an Alternating Current (AC) adaptor, a cigar jack, and so on. In the case of supplying electric power via the USB port, data communication with a computer can, of course, be established.

The non-contact charging station 10 also includes a temperature sensor 18 detecting the internal temperature of the non-contact charging station 10. The charging operation can be selectively stopped when the temperature detected by the temperature sensor 18 rises (e.g., the temperature of the station part locally rises), and the entire operation of the system can be stopped when the temperature detected by the temperature sensor 18 further rises (e.g., the entire non-contact charging station is over-heated).

In addition, the non-contact charging station also includes a current sensor 17 such as a current-detecting element connected to the power supply part 13, the pre-driver 15, the resonant converter 14, and the received signal processor 19 to monitor a flow of current in and between components. When the current sensor 17 detects an excessive current or voltage from any one of the components, the charging operation of the non-contact charging station 10 or the operation of the system can be stopped.

Below, a more detailed description will be given of the non-contact charging station 10 and the non-contact power-receiving apparatus 50 configured as above.

An induced magnetic field occurring from the primary core 31 in the station part 30 of the non-contact charging station 10 causes an induced current in the secondary core 51 of the non-contact power-receiving apparatus 50. The induced current also causes induced electric power to charge a battery cell 53.

In this case, a battery pack controller 54 detects the intensity of the induced electric power and transmits a detection signal to the non-contact charging station 10, which in turn controls the intensity of the induced magnetic field generated from the primary core 31 based on the received detection signal (i.e., data).

As a result, the level of the electric power can be controlled so as to stably charge a portable device.

In addition, the non-contact power-receiving apparatus 50 can be implemented as a battery pack or semi-battery pack, which is provided as a separate unit from the portable device so as to be attached to and detached from the portable device. Alternatively, the non-contact power-receiving apparatus 50 can be integrally configured so as to be mounted inside the portable device according to the intention of a person of ordinary skill in the art.

The non-contact power-receiving apparatus 50 for receiving the induced electric power as above includes a rectifier block 52 connected with the secondary core 51 to rectify an induced current and a battery pack controller 54 processing data transmitted/received via the secondary core 51. The data transmitted/received via the second core 51 can be detected by the current sensor 17 of the non-contact charging station 10.

In addition, the non-contact power-receiving apparatus 50 also includes a charge circuit block 55 and a charge monitor circuit block 56. The charge circuit block 55 allows electric power supplied from the rectifier block 52 to be charged to the battery cell 53 under the control of the battery pack controller 54. The charge monitor circuit block 56 monitors the level of charge of the battery cell 53 and transmits a signal notifying that the battery cell 53 is fully charged or is discharged to the battery pack controller 54.

The battery pack controller 54 controls components of the non-contact power-receiving apparatus 50 such as the rectifier block 52, the charge circuit block 55, the charge monitor circuit block 56, and a gauge block 57, and transmits data such as charge state information to the non-contact charging station 10. The charge monitor circuit block 56 is fitted between the charge circuit block 55 and the battery cell 53. The charge monitor circuit block 56 detects a current supplied to the battery cell 53, transmits charge state information of the battery cell 53 to the battery pack controller 54, and detects an excessive voltage, an insufficient voltage, an excessive current, a short-circuit, and the like from the battery pack.

In addition, the battery pack controller 54 of the non-contact power-receiving apparatus 50 determines whether or not the induced electric power is stably received by monitoring the induced electric power received through the secondary core 51 and measuring the voltage of the induced electric power. A variety of reference voltages of the received induced electric power can be selected based on the specifications of the non-contact power-receiving apparatus 50 according to the intention of a person of ordinary skill in the art. For example, the reference voltage can be set on the order of 2 to 20 V. The reference voltage can also be set about 5 V in the case of being applied to a typical electronic device.

The charge monitor circuit block 56 determines whether the induced electric power is a low or high voltage by comparing the voltage of the received induced electric power to a preset reference voltage. For example, when the reference voltage is 5 V, if the voltage of the induced electric power is lower by about 0.5 to 1.5 V than the reference voltage 5 V, the charge monitor circuit block 56 determines the induced electric power as a low voltage. If the voltage of the induced electric power is higher by about 0.5 to 1.5 V than the reference voltage 5 V, the charge monitor circuit block 56 determines the induced electric power as a high voltage.

When the voltage of the induced electric power is determined to be a high or low voltage, the battery pack controller 54 transmits information on the degree of voltage calibration together with the unique Identification (ID) of the non-contact power-receiving apparatus 50 to the non-contact charging station 10. Then, the non-contact charging station 10 controls the level of electric power induced from the primary core 31 based on the received voltage calibration information.

Figure 2:
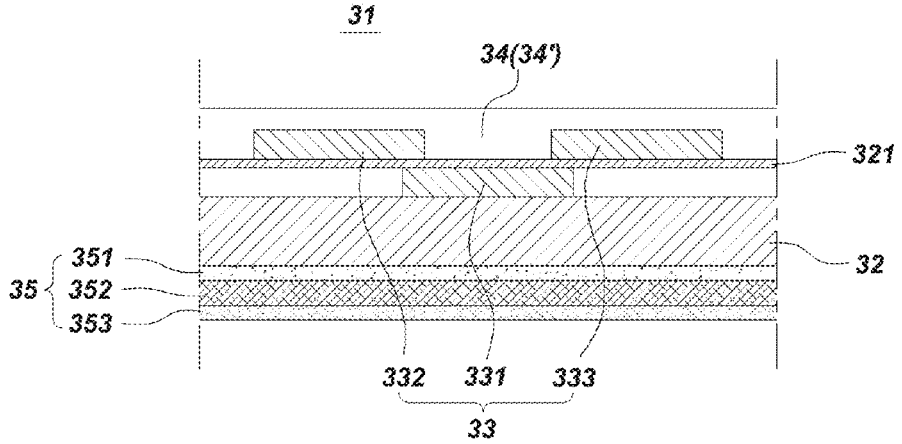
FIG. 2 is a cross-sectional view illustrating a primary core of the non-contact power-receiving apparatus in accordance with one exemplary embodiment of the present invention.

As shown in FIG. 2, the primary core 31 of the non-contact charging station 10 includes an inductance pattern core 33 on a core base 32, which is fastened to the station part 30.

Figure 3:
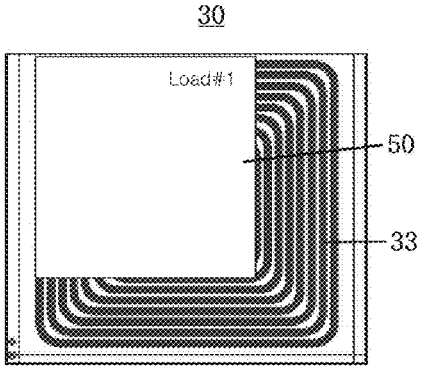
FIGS. 3 through 5 are top plan views illustrating some embodiments of the primary core of the non-contact power-receiving apparatus in accordance with the present invention.
Figure 4:
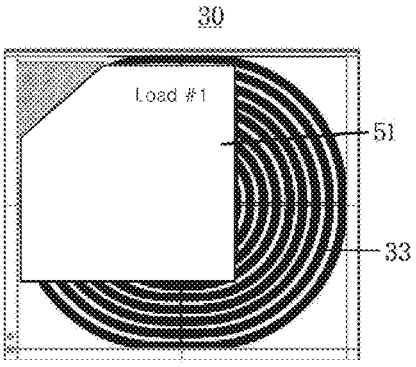

The inductance pattern core 33 includes a power transmission PCB core having a planar spiral structure. The power transmission PCB core is realized by forming one or more layers of planar-spiral cores made of copper on a PCB. The power transmission PCB core can be configured with a square-spiral structure as shown in FIG. 3, a circular-spiral structure as shown in FIG. 4, an elliptical-spiral structure, a quadrangular-spiral structure, and the like.

As a result, according to the present invention, the inductance pattern core 33 of the primary core 31 having the planar-spiral structure can be easily manufactured on the core base 32. Furthermore, the primary core 31 manufactured as above can also be easily mounted on the station part 30.

Figure 5:
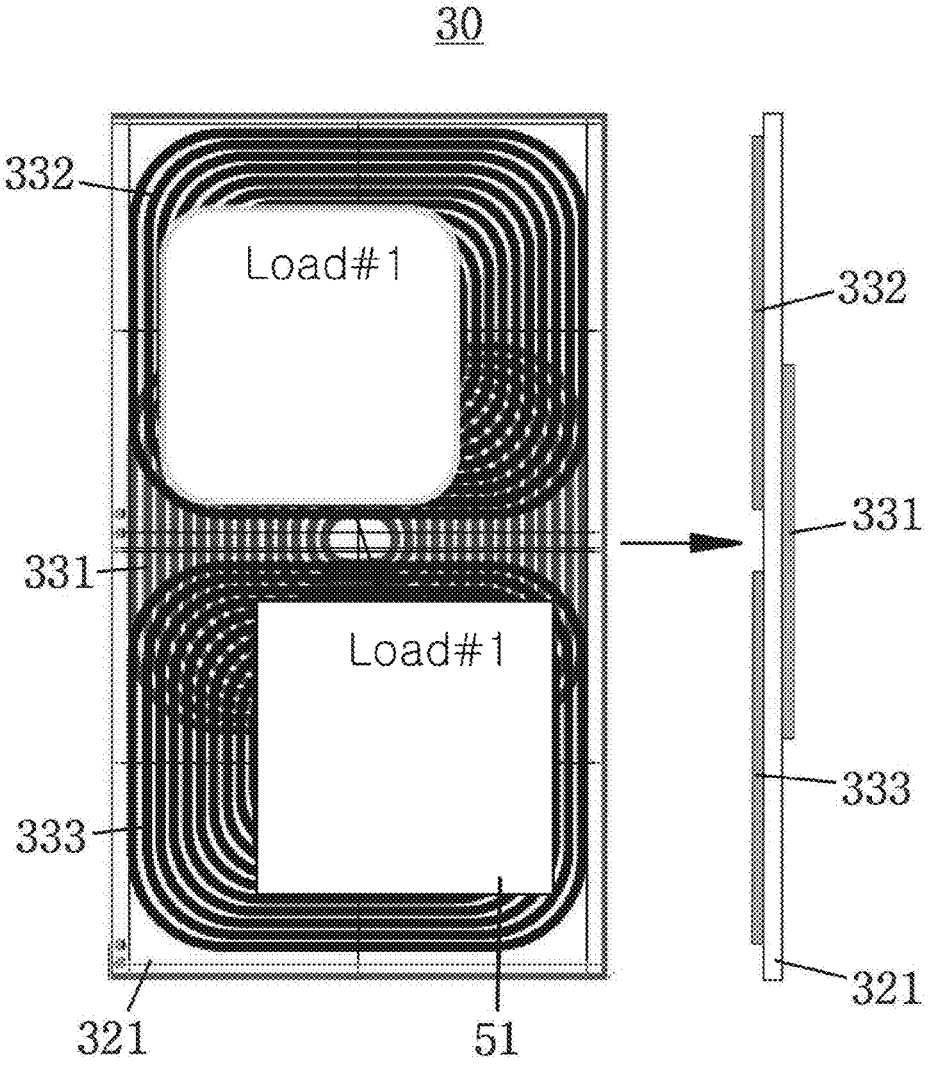

In addition, as shown in FIGS. 2 and 5, the inductance pattern core 33 can be configured as a multi-layer structure including a base core 331, a first upper core 332 and a second upper core 333. Alternatively, the inductance pattern core 33 can have a number of planar core layers according to the intention of a person of ordinary skill in the art.

For example, in the case where the charging station is applied to a small portable device consuming less electric power, the core can be configured with a single layer. In the case where the charging station is applied to a large portable device consuming more electric power, the core can be configured with multiple layers in order to improve power-receiving efficiency as well as to stabilize power charging.

In addition, as shown in FIG. 2, a Photosensitive Solder Resist (PSR) layer 34 is coated on top of the inductance pattern core 33 of the primary core 31 to prevent the inductance pattern core 33 from being damaged so that an induced magnetic field can be generated more stably. The PST layer 34 can be configured as an electroless plating layer in order to prevent the inductance pattern core 33 of the primary core 31 made of copper from being damaged as well as to improve the efficiency of the induced magnetic field transmitted toward the secondary side battery pack, thereby improving total power transmission efficiency.

The primary core 31 also includes a shielding section 35 under the inductance pattern core 33, and the shielding section 35 includes a shielding panel 351, a shielding mesh 352, and a metal thin film 353.

The shielding panel 351 can be made to contain 55 to 75 parts by weight of sendust and 25 to 55 parts by weight of polyurethane. Sendust is a high magnetic permeability alloy containing aluminum, silicon, iron, etc. The shield panel is formed by combining sendust having excellent shielding performance with polyurethane. If the content of sendust exceeds 55 parts by weight, the shielding performance may degrade. In contrast, if the content of sendust exceeds 75 parts by weight, the performance does not improve compared to the amount of sendust used.

Since the shielding panel 351 is configured as a sendust-containing panel as described above, it can efficiently shield a magnetic field radiating downward, thereby ensuring the performance of an electronic device and the like mounted on the non-contact charging station 10.

In addition, the shielding mesh 352 is a member that reduces an eddy current associated with an induced electromotive force generated by an induced magnetic field. The shielding mesh 352 has a mesh-like polyester body on which an eddy current-reducing composition is coated. The eddy current-reducing composition can contain 55 to 65 parts by weight of nickel and 35 to 45 parts by weight of zinc. The shielding mesh may be implemented with a metal net of about 100 to 200 mesh, and more preferably, 135 mesh.

As a result, an eddy current that may be generated from the non-contact charging station 10 is cleared by the shielding mesh 352 that is an eddy current-reducing member.

In addition, the metal thin film 353 is implemented with an aluminum thin film. The metal thin film 353 is placed in the bottom of the shielding section 35 (e.g., HPES: Hanrim Postech Electro-magnetic Shield) to ultimately shield a magnetic field, thereby preventing the magnetic field from influencing the circuit.

In the non-contact charging station 10 of the present invention as described above, as shown in FIG. 5, the primary core 31 of the station part 30 can include at least one upper core and a lower core, which in part overlap each other on the plane.

The upper and lower cores can be laid one on another repeatedly. For example, as shown in FIG. 5, when the non-contact power-receiving apparatus 50 moves downwards on the first upper core 332, electric power can be continuously supplied via the base core 331 and the second upper core 333 since the base core 331 and the second upper core 333 can communicate with the secondary core 51 of the non-contact power-receiving apparatus 50. When the non-contact power-receiving apparatus 50 is completely moved onto the second upper core 333, the first upper core 332 does not supply electric power any longer to prevent waste of power.

Figure 6:
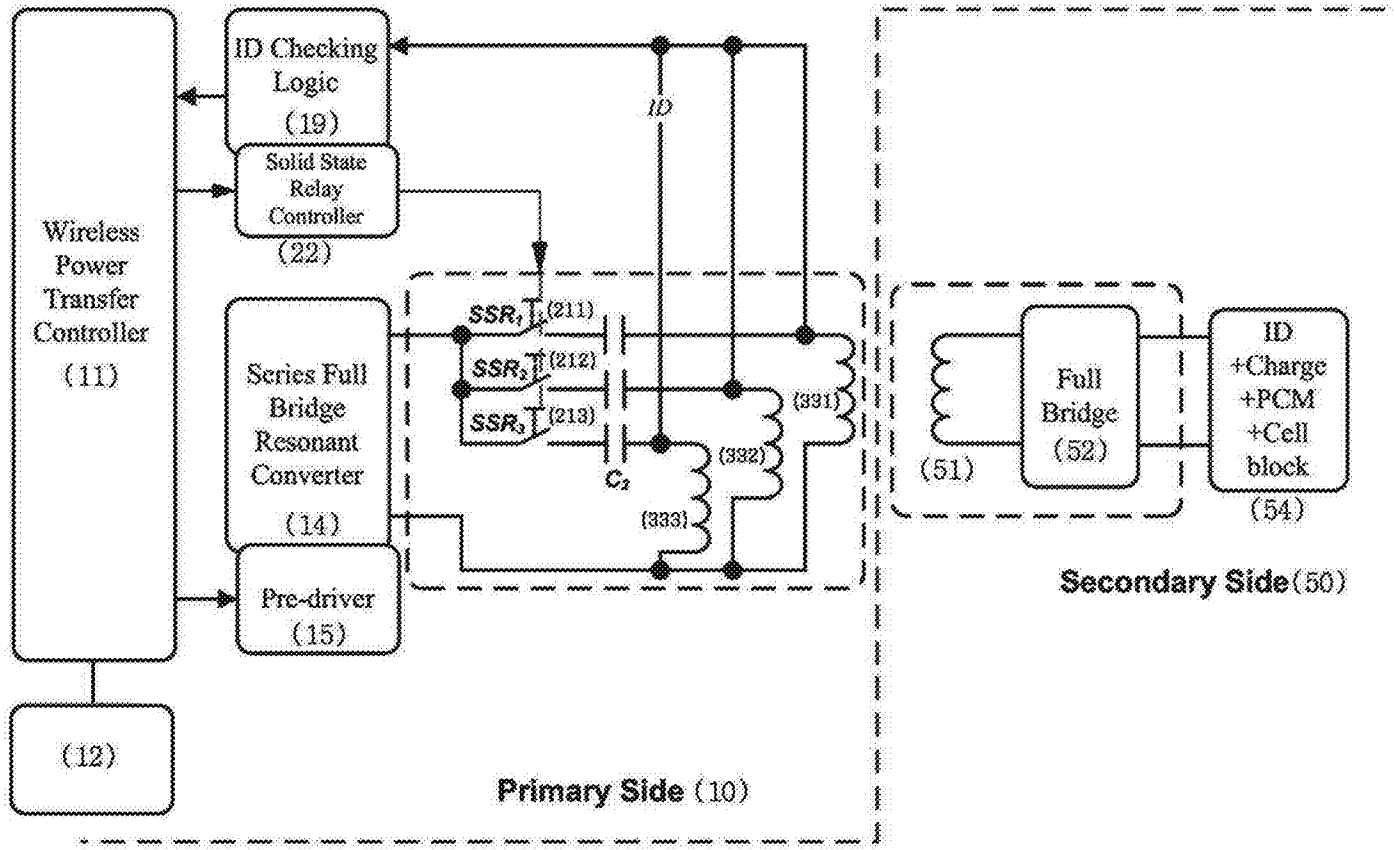
FIG. 6 is a block diagram illustrating a circuit of the non-contact charging station and the non-contact power-receiving apparatus, for controlling the primary core having a multi-layer structure shown in FIG. 5.

As shown in FIG. 6, the received signal processor 19 of the non-contact charging station 10 continuously transmits/receives signals to/from the non-contact power-receiving apparatus 50 while maintaining connection with the base core 331, the first upper core 332, and the second upper core 333 of the primary core 31.

In addition, a plurality of separate switches are provided in order to separately control power transmission via the base core 331, the first upper core 332, and the second upper core 333. The switches include a first switch 211 ('SSR1' in FIG. [8] *6*) connected between the resonant converter 14 and the base core 331, a second switch 212 ('SSR2' in FIG. [8] *6*) connected between the resonant converter 14 and the first upper core 332, and a third switch 213 ('SSR3' in FIG. [8] *6*) connected between the resonant converter 14 and the second upper core 333.

There is also provided a solid state relay controller 22 that allows the first through third switches 211 to 213 to be switched under the control of the transmission controller 11.

Accordingly, in the transmission controller 11 detecting the non-contact power-receiving apparatus 50 and transmitting induced electric power to the non-contact power-receiving apparatus 50 via the base core 331, the first upper core 332 and the second upper core 333, when the received signal processor 19 (i.e., an ID checking logic) receives a signal detected from the base core 331 or the first or second upper core 332 or 333 and transmits the detection signal to the transmission controller 11, the transmission controller 11 (i.e., a wireless power transfer controller) determines which one of the signals transmitted from the base core 331, the first upper core 332, and the second upper core 333 is most stable. Afterwards, the transmission controller 11 controls a switch connected to a core that stably transmits/receives the signal so that induced electric power can be transmitted via the corresponding core. Then, the corresponding core generates an induced magnetic field for transmitting a power signal via the pre-driver 15 and the resonant converter 14 (i.e., a series full bridge resonant converter).

Below, a method for controlling the non-contact charging station 10 of the present invention will be described with reference to FIGS. 7 through 9.

Firstly, the primary core 31 transmits a request signal for a unique ID to the non-contact power-receiving apparatus 50 under the control of the transmission controller 11 (standby step S11). In the standby step S11, the base core 331, the first upper core 332, and the second upper core 333 sequentially transmit unique ID request signals via the pre-driver 15, the resonant converter 14 and the solid state relay controller 22. The unique ID includes a unique ID of each core of the primary core 31, and a unique ID of the non-contact power-receiving apparatus 50.

Also, in the standby step S11, the non-contact power-receiving apparatus 50 detects the sensitivity of a signal (e.g., the intensity of an induced current and voltage) transmitted from the non-contact charging station 10, selects a core providing the best sensitivity, and transmits a response signal including the unique ID of the selected core, the unique ID of the non-contact power-receiving apparatus 50, and information about the sensitivity of the core.

The response signal transmitted from the non-contact power-receiving apparatus 50 is transferred to the received signal processor 19 of the non-contact charging station 10.

When the standby step S11 is completed, the received signal processor 19 extracts data-specific information by analyzing the response signal transmitted from the non-contact power-receiving apparatus 50 (ID signal detecting step S12). The extracted information includes the unique ID of the core, the sensitivity of the core, and the unique ID of the non-contact power-receiving apparatus 50.

When the ID signal detection step S12 is completed, information extracted from the received signal processor 19 is transferred to the transmission controller 11, which in turn determines which one of the first upper core 332, the second upper core 333, and the base core 331 matches the unique ID by analyzing the transferred information (locating step S13).

When the core providing the best sensitivity is selected as described above, the controller 11 transmits a switching signal for turning on a corresponding switch (e.g., a switch 211 when the first upper core is selected) to the solid state relay controller 22 (switch control signal transmitting step S14).

When the corresponding switch is turned on by the switch control signal transmitting step S14, the pre-driver 15 transmits an oscillation signal to the resonant converter 14 under the control of the transmission controller 11, and the resonant converter 14 supplies electric power to the corresponding core via the turned-on switch, so that the core generates an induced magnetic field to charge the battery cell 53 of the non-contact power-receiving apparatus 50 (non-contact power transmitting step S15). In this case, the other switches corresponding to the other cores except for the selected core can be controlled to be turned off in order to prevent waste of power.

Figure 8:
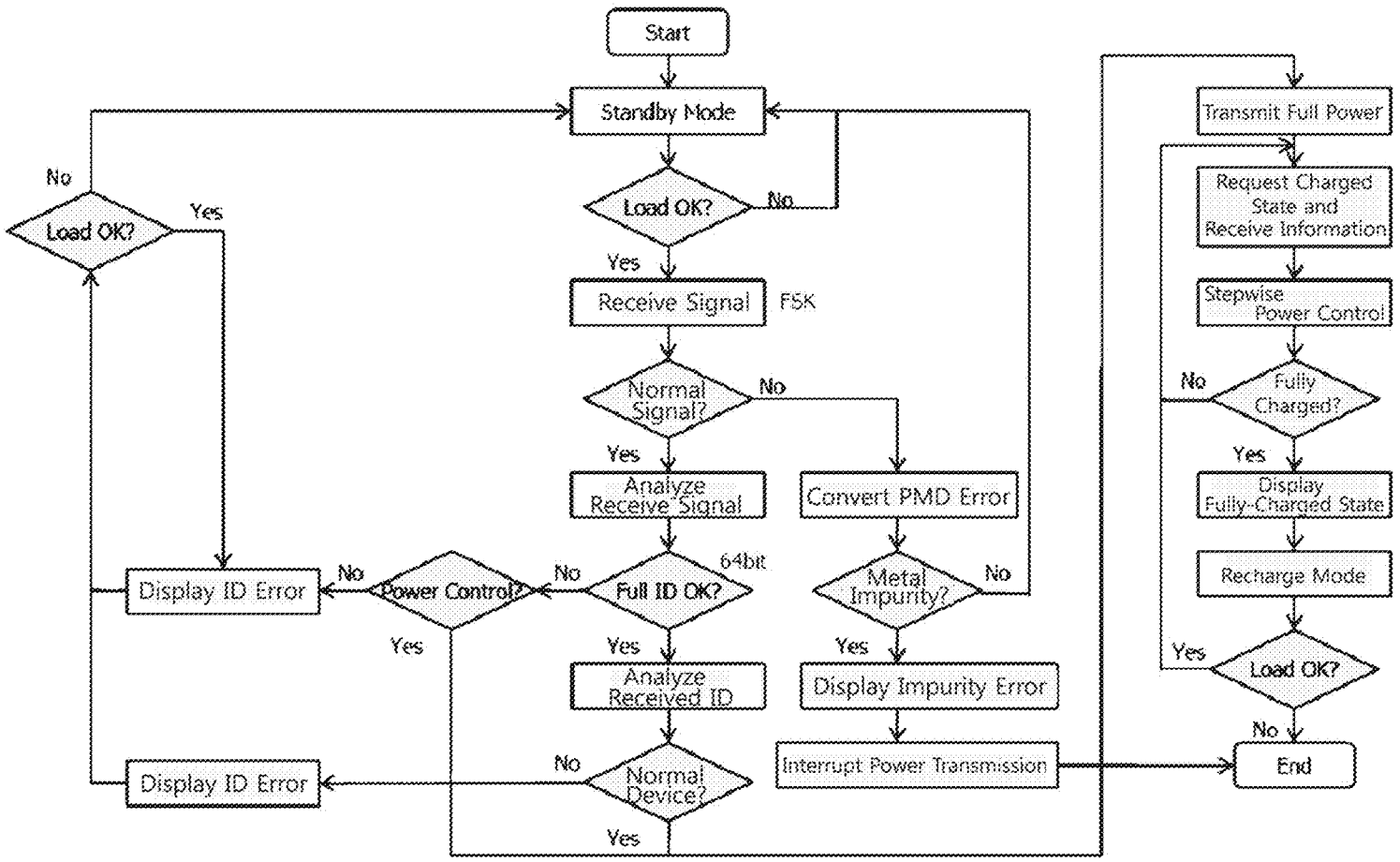
FIG. 8 is a flowchart illustrating one embodiment of process control over the non-contact charging station having a planar-spiral power transmission core in accordance with the present invention.

In addition, as shown in FIG. 8, the non-contact charging station 10 includes a display unit 101 implemented with a display device (e.g., an LCD or LEDs) for displaying a unique ID and charging state so that the non-contact power-receiving apparatus 50, which is a dedicated battery pack capable of being wirelessly charged, can be identified. A step of outputting information (not shown) using that component can also be included.

A radio communication module (e.g., a Bluetooth, Zigbee, WiFi, or WiBro module) capable of synchronizing with a radio data communication function embedded in the portable device can also be provided. In addition, there are additional steps of detecting whether or not other metallic bodies other than the portable device to be charged is placed on the station part and stopping the charging operation (i.e., an impurity detecting function), and protecting against overload and excessive temperature.

Figure 7:
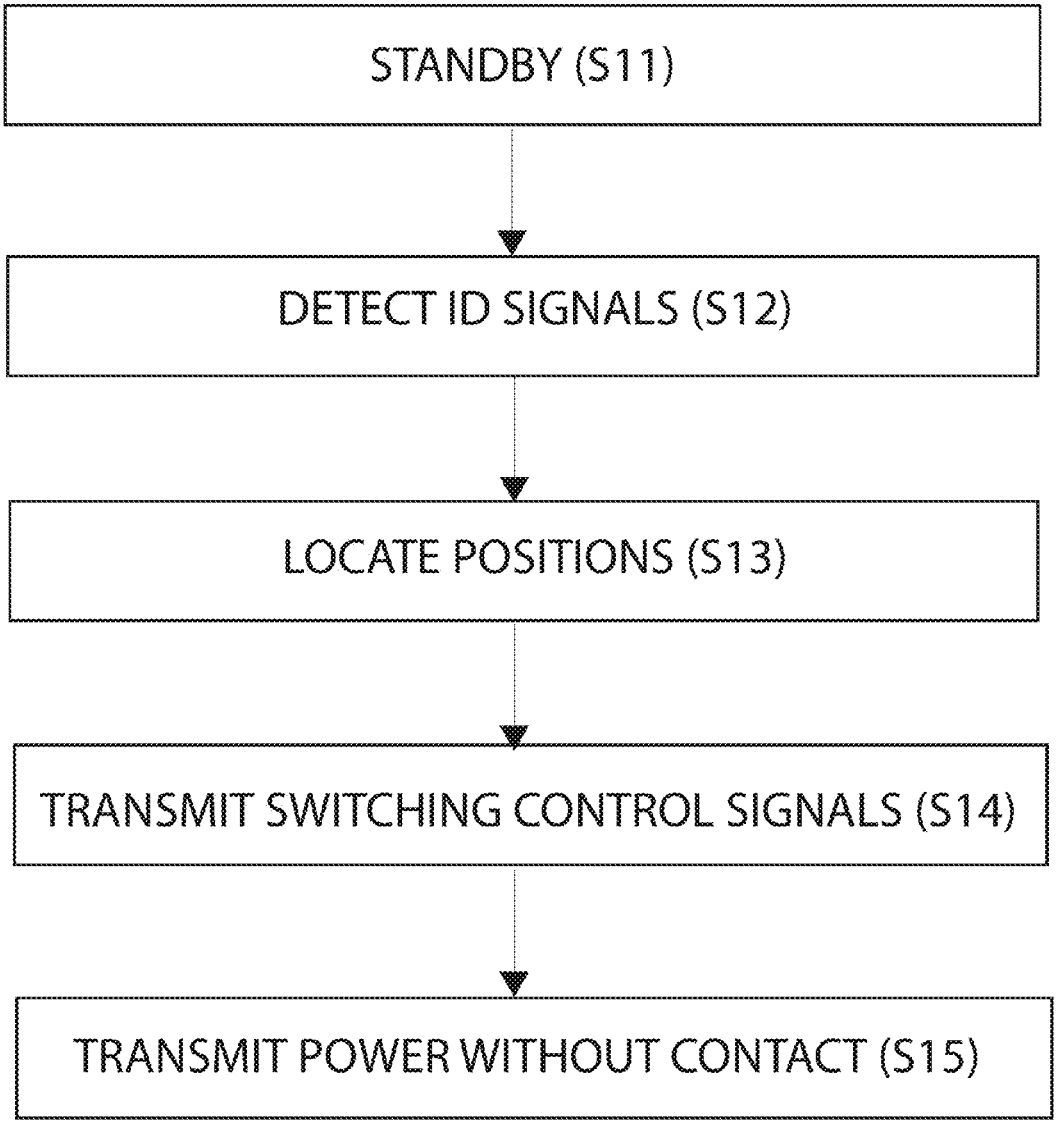
FIG. 7 is a flowchart illustrating a method for controlling the non-contact charging station and the non-contact power-receiving apparatus having a planar-spiral power transmission core in accordance with the present invention.
Figure 9:
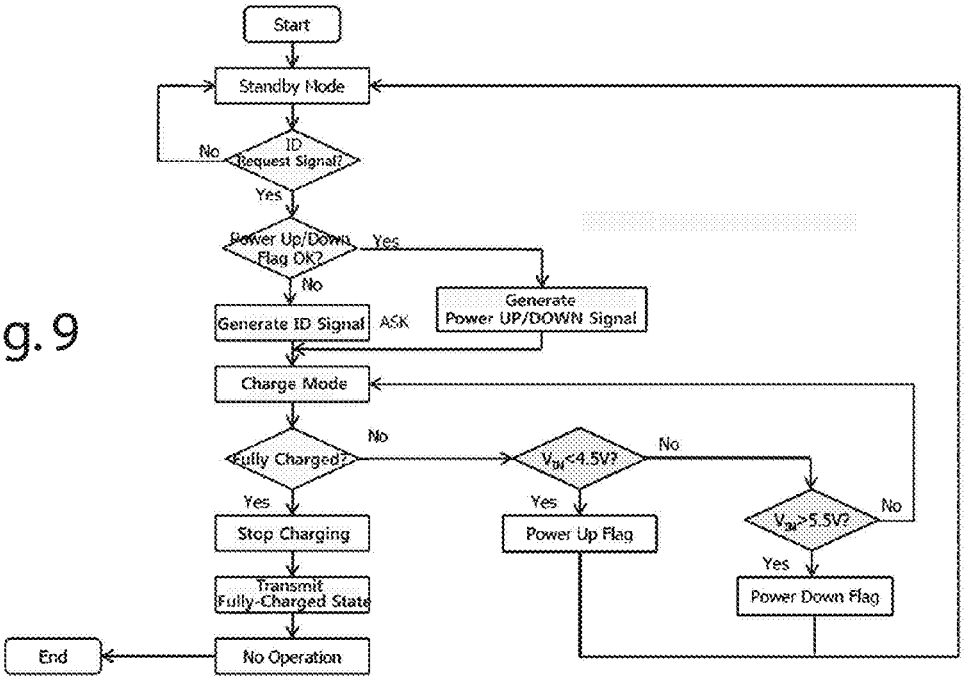
FIG. 9 is a flowchart illustrating one embodiment of process control over the non-contact power-receiving apparatus having a planar-spiral power transmission core in accordance with the present invention.

In the attached drawings, FIG. 8 is a flowchart of the non-contact charging station 10 in the process of FIG. 7, and FIG. 9 is a flowchart of the non-contact power-receiving apparatus 50 in the process of FIG. 7.

In the meantime, the core of the station part 30 of the non-contact charging station 10 in accordance with the present invention is implemented with a thin film-like power transmission PCB core, instead of a Litz core, using bond wires according to the related art. Therefore, the core, in accordance with the present invention, has superior characteristics and improved functions over the existing cores and can be easily used and manufactured.

Especially, when only one thin film-like power transmission PCB core as described above is provided, the core can be designed with a size 45 to 55 Φ in order to prevent impurity-detecting ability and other power transmission efficiency from degrading.

Furthermore, when the battery pack moves in a wider range than that of the core as described above, it is difficult to stably transmit electric power using one core. If the core size is enlarged to resolve this difficulty, a magnetic field may be concentrated to the central portion, so that the magnetic field has excessively-high intensity in the central portion but a low intensity on the edges. Since this forms a parabolic profile, a transmitted voltage may be unbalanced.

Accordingly, when the single core is provided, the charging plate of the station part 30 is reduced in size so that the non-contact power-receiving apparatus 50 does not move. In contrast, when the station part 30 is enlarged to charge a greater size of the non-contact power-receiving apparatus 50 or a plurality of the non-contact power-receiving apparatuses 50, a plurality of the power transmission PCB cores are provided. In this case, the plurality of cores can be implemented with a plurality of layers as shown in FIGS. 2, 5 and 6, so as to overlap each other on the plane. Consequently, stable power transmission can be constantly realized even if the non-contact power-receiving apparatus 50 shakes and is thus displaced.

As shown in FIG. 6, the received signal processor 19 of the non-contact charging station 10 has the function of extracting an Inductor-Capacitor (LC) resonant signal by employing a filtering technique in order to extract a data signal with a unique ID transmitted from the non-contact power-receiving apparatus 50. In addition, the transmission controller 11 controls a pulse signal to be generated for a predetermined time, and has an ID scanning function that discerns a unique ID signal received from the secondary side non-contact power-receiving apparatus 50. The transmission controller 11 also generates a signal for controlling the sequence of a four-phase switch of a serial resonant converter. Then, the resonant converter 14 is switched via the pre-driver 15.

Accordingly, the solid state relay controller 22 performs switching so that an induced magnetic field is generated from one of the three planar PCB cores (i.e., the planar-spiral power transmission PCB cores) of the primary core 31.

A voltage is induced on the secondary core 51 and the rectifier block 52 of the non-contact power-receiving apparatus 50 by the induced magnetic field as described above, and is then rectified through the rectifier circuit. The battery pack controller 54 of the non-contact power-receiving apparatus 50 transmits a unique ID data signal to the primary side, performs a control switching function of switching on/off a charging IC in order to start a charging mode, transmits a state value, which is fed back when fully charged, to the primary side, controls the charge circuit block 55 for charging the battery cell, and controls the charge monitor circuit block 56 to receive detection data of the battery cell 53 including an excessive voltage, an excessive current, a low residue voltage, and the like.

In the non-contact charging station 10 of the present invention as described above, a description will be given of a case where the primary core 31 is configured as a square multi-layer structure. As shown in FIGS. 2, 5 and 8, the primary core 31 includes the base core 331, the first upper core 332, and the second upper core 333. Even if the secondary core 51 (i.e., the square area designated with 'Load #1' in FIG. 5) is located on any part of the primary core 31, it is located within the area of any one of the three planar winding cores including the first upper core 332, the second upper core 333, and the base core 331, which are power transmission PCB cores.

Thus, even if the secondary core 51 is positioned on any part of the primary core 31, the place of the primary core 31 can be located and thereby only a corresponding core can be turned on to charge the non-contact power-receiving apparatus 50.

In other words, only the first upper core 332 is turned on under control but the second upper core 333 and the base core 331 are turned off when the secondary core 51 designated with 'Load #1' in FIG. 5 is located on the first upper core 332.

When the secondary core 51 is displaced from the first upper core 332 onto the second upper core 333 as shown in FIG. 5, the operation of the first upper core 332 is turned off but the second upper core 333 is turned on, so that the charging operation on the non-contact power-receiving apparatus 50 can proceed without interruption.

When the voltage measured from the rectifier does not exceed a predetermined value (e.g., 4.5 V), the non-contact power-receiving apparatus 50, which is being charged, transmits a signal regarding the power compensation to the non-contact charging station 10 as shown in FIG. 9. The non-contact charging station 10 receives the signal regarding the power compensation from the non-contact power-receiving apparatus 50, and transmits a power signal, the transmission power of which is being compensated, to the non-contact power-receiving apparatus 50 as shown in FIG. 8.

According to a control algorithm shown in FIGS. 8 and 9, a voltage induced on the secondary side non-contact power-receiving apparatus 50 is controlled in the range from 4.5 to 5.5 V so that the non-contact power-receiving apparatus 50 can be stably charged.

Figure 10:
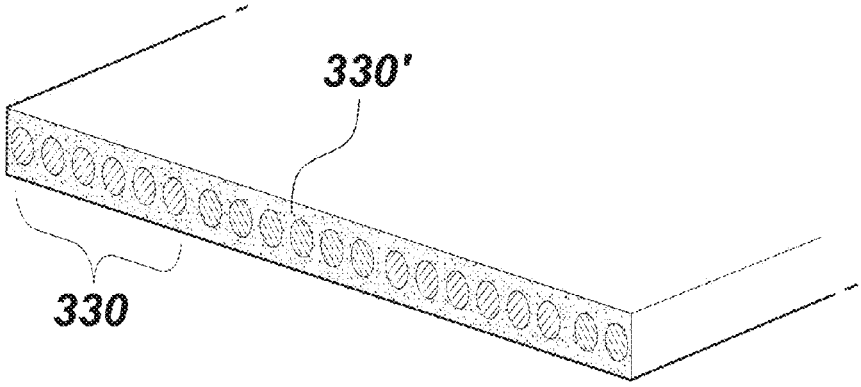
FIG. 10 is a perspective view illustrating a cross section of a unit core provided in the primary core and the secondary core in accordance with the present invention.

In the meantime, a unit core of the primary core 31 and the secondary core 51 is configured as shown in FIG. 10.

Specifically, a unit core 330 made of copper is formed into an intended shape, and is fixed so as not to play using a bonding member 330'. As shown in FIG. 2, the unit cores are fixed to the core base 32 and a spacer member 321. While the core 330 made of copper is illustrated as having a circular cross section, its cross-sectional shape can be changed into a square. The entire shape of the unit core on the plane can be a circle, an ellipse, or a polygon such as a square.

Below, with reference to Table 1 below, a description will be given of the characteristics of the above-described unit core according to the size:

TABLE 1

Power Consumption of Primary Core of Non-Contact Charging Station according to Size

| Classification | Case 1 | Case 2 | Case 3 |
|---|---|---|---|
| Size of primary core | 45Φ | 55Φ | 65Φ |
| DC voltage induced on secondary rectifier with no load | 7 V | 10 V | 14 V |
| DC voltage induced on secondary rectifier with load (@2.5 W) | 5 V | 6 V | 7 V |
| Voltage drop difference ($V_{drop}$) (=a − b) | 0.5 (5-4.5) | 0.15 (6-4.5) | 2.5 (7-4.5) |
| Power consumption (W) (=load voltage * Voltage drop difference) | 0.25 (0.5 * 0.5) | 0.75 (0.5 * 0.75) | 1.25 (0.5 * 2.5) |

As reported in Table 1 above, secondary rectifier voltages (@2.5 W), namely, voltages obtained by measuring a rectifier in the secondary side non-contact power-receiving apparatus 50 were obtained by measuring loads at a load current 500 mA and a load voltage 5V, and voltage drop differences ($V_{drop}$) were when battery cells were charged with 4.5 V using voltages generated from the rectifiers via the secondary core 51 of the non-contact power-receiving apparatus 50.

Referring to the measurement results reported in Table 1 above, with no load, the voltage induced on the rectifier increases as of the primary core 31 of the non-contact charging station 10 increases in size. With load, increases as the primary core increases in size the voltage drop difference and is thus consumes more power.

Therefore, when the battery pack is the non-contact power-receiving apparatus 50 applied to a typical portable phone, the primary core 31 of the non-contact charging station 10 can have a rectangular structure with one pattern core 50×45 $mm^2$, whereas the secondary core 51 of the non-contact power-receiving apparatus 50 can have a rectangular structure with a smaller size.

Now, with reference to Table 2 below, a description will be given of the characteristics of the above-described unit core according to the shape:

TABLE 2

Power Consumption of Primary Core of Non-Contact Charging Station according to Shape

| Item | Circular planar PCB winding | Rectangular planar PCB winding |
|---|---|---|
| Mobility according to position of secondary load | 5 V (Center)<br>3.5 V (Edge) | 4.8 V (Center)<br>4.5 V or more (Edge) |
| Energy efficiency (@2.5 W load) | 60% | 59% |
| Performance estimation | Efficiency is slightly high, | Efficiency is similar, with less |

TABLE 2-continued

| Power Consumption of Primary Core of Non-Contact Charging Station according to Shape | | |
|---|---|---|
| Item | Circular planar PCB winding | Rectangular planar PCB winding |
| | with limitations due to displacement of battery pack | limitations due to displacement of battery pack |

Table 2 above illustrates the characteristics based on the position of the secondary core displacing according to the shape of the primary core. When the primary core has a circular shape, the power transmission characteristic in the central portion of the core is good but degrades when the secondary core is positioned on the edge. In contrast, when the primary core has a rectangular shape, power transmission efficiency does not degrade even if the secondary core is displaced to the edge. It can be appreciated that the rectangular primary core does not have strict positional limitations.

Figure 11:
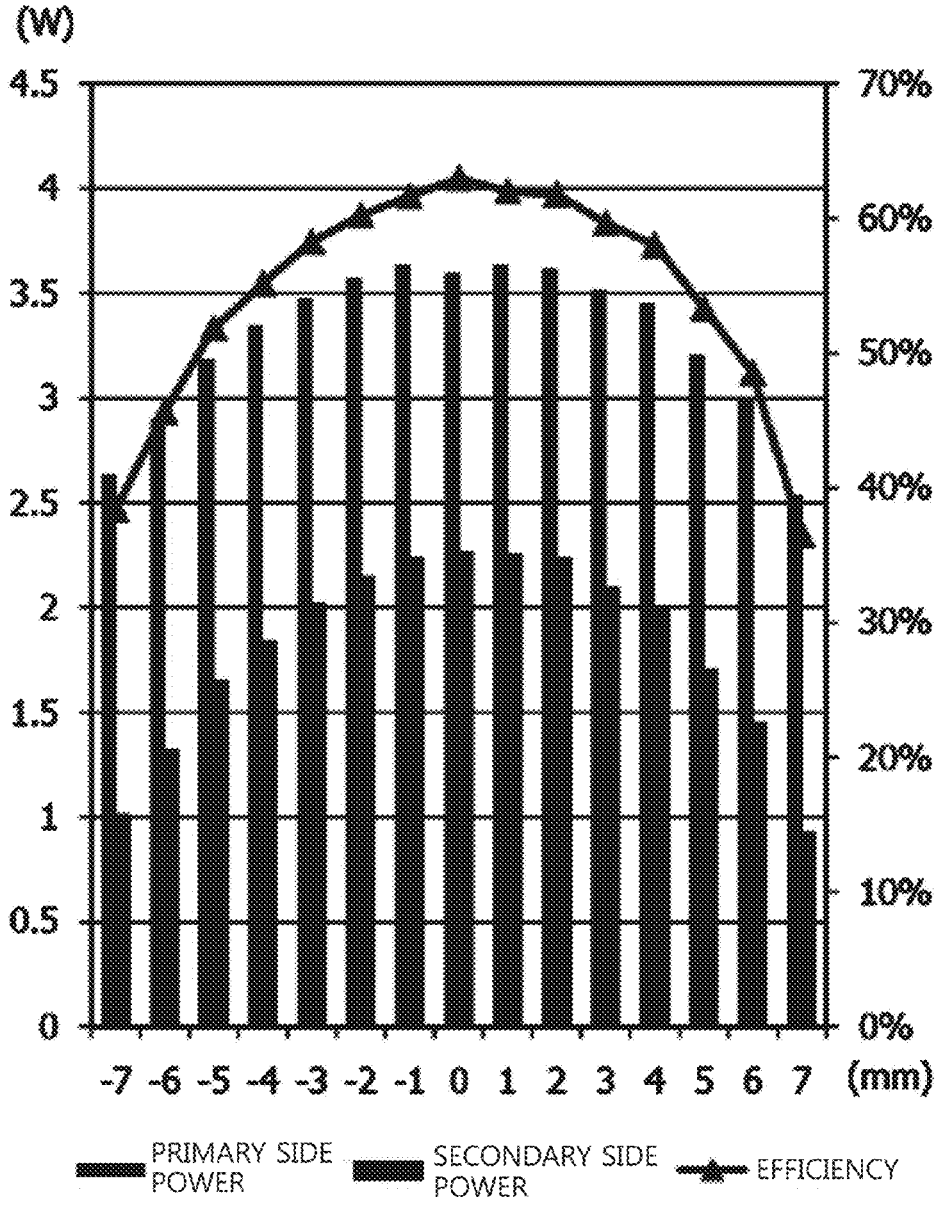
FIG. 11 is a graph illustrating amounts of induced current on the primary core and the secondary core and resultant efficiency before voltage calibration.
Figure 12:
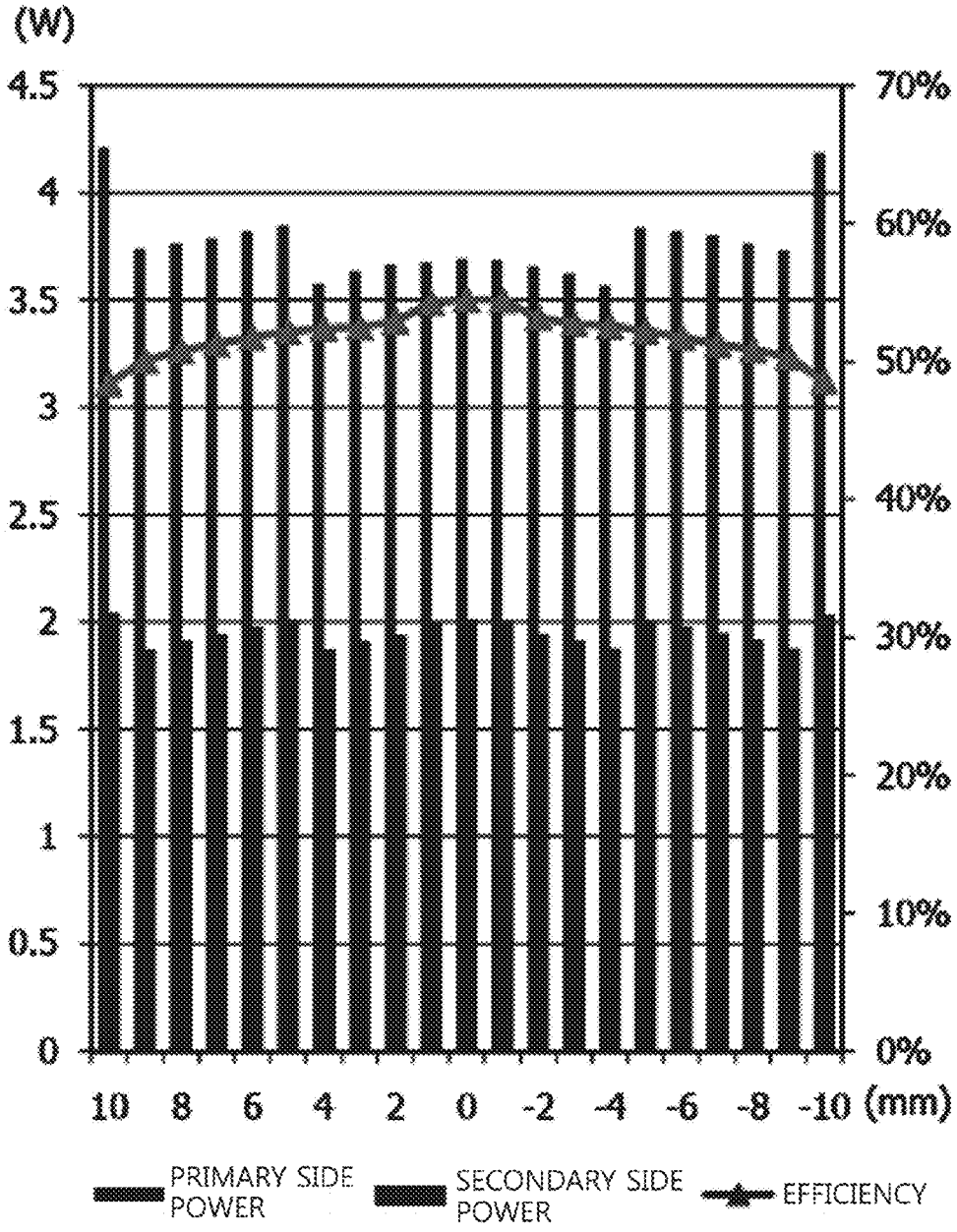
FIG. 12 is a graph illustrating amounts of induced current on the primary core and the secondary core and resultant efficiency after voltage calibration.

For reference, FIG. 11 is a graph before the voltage of induced electric power is calibrated, and FIG. 12 is a graph after the voltage of induced electric power is calibrated. FIG. 12 shows that power can be stably supplied by applying algorithms shown in FIGS. 8 and 9.

The characteristics of the cores having the above-described configuration in accordance with the present invention as illustrated in FIG. 2 will be compared with those of the conventional Litz core as reported in Table 3 below.

TABLE 3

| Comparison with Convention Litz Core | | | |
|---|---|---|---|
| Items | Litz core | PSR PTPCB core | EGPL-PTPCB core |
| Material | Copper (99.99%) | Copper (70 μm) + PSR Coating | Copper (70 μm) + Electroless plating (0.03 μm) |
| Thickness | 0.35 mm | 0.4 mm | 0.4 mm |
| Size | 32 × 32 mm | 32 × 32 mm | 32 × 32 mm |
| Shape | Rectangular | Planar rectangular | Planar hexagon |
| Number of turns | 20 (Litz shape) | 24/(1Layer) | 24/(2Layer) |
| Number of threads per turn | 7 | 1 | 1 |
| Thickness of wire | 0.15Φ | 1 mm/2 oz | 1 mm/2 oz |
| Inductance | 7.7 uH | 11 uH | 7.8 uH |
| Q (no shield) | 27 | 9 | 20 |
| DCR (Internal resistance) | 230 mΦ | 850 mΦ | 350 mΦ |
| Efficiency @ 2.5 W (5 V × 500 mA) | 61% | 53% | 60% |
| Temp @ 2.5 W (5 V × 500 mA) | 40 | 42 | 40 |
| Rate of change of inductance | 1.5% | 0.5% | 0.5% |
| Operation frequency | 100~250 kHz | 100~250 kHz | 100~250 kHz |
| Cost | Middle (Facility investment required) | Low | Middle (Facility investment not required) |
| Performance | Average | Average | Good |

In comparing the cores of the present invention with the conventional Litz core in Table 3, the cores of the present invention were the PSR-coated copper core and the electroless-plated copper core. Of course, it should be understood that the present invention is not limited to the above-rendered numeric values but a variety of numeric values can be applied without departing from the scope of the present invention.

In Table 3, the efficiency and temperature indicate an efficiency (or temperature) that is a ratio of power output from the secondary non-contact power-receiving apparatus 50 with respect to power input to the primary non-contact charging station 10 for generating an induced magnetic field when load of 2.5 W is applied to the secondary side.

As such, since the secondary core 51 of the present invention is formed as a power transmission PCB core by performing PSR coating or electroless plating on a copper core, a smaller amount of material is spent to manufacture the core of the present invention and a manufacturing process is simplified even if the efficiency is similar to that of the conventional Litz core. Of course, the core of the present invention is easily installed in the non-contact power-receiving apparatus 50.

Furthermore, even if inductance is required to change at a stable rate in power signal-receiving efficiency with respect to an induced magnetic field, the rate of change of inductance is high in the conventional Litz core. In contrast, the planar-spiral power transmission PCB core of the present invention can ensure a stable rate of change of inductance, generally stabilizing and improving the power-signal receiving efficiency.

In particular, Table 3 above describes the performance of the pattern core made of copper configured as the power transmission PCB core in accordance with the present invention, particularly, with respect to a case where PSR is coated and a case where electroless plating is performed.

Figure 15:
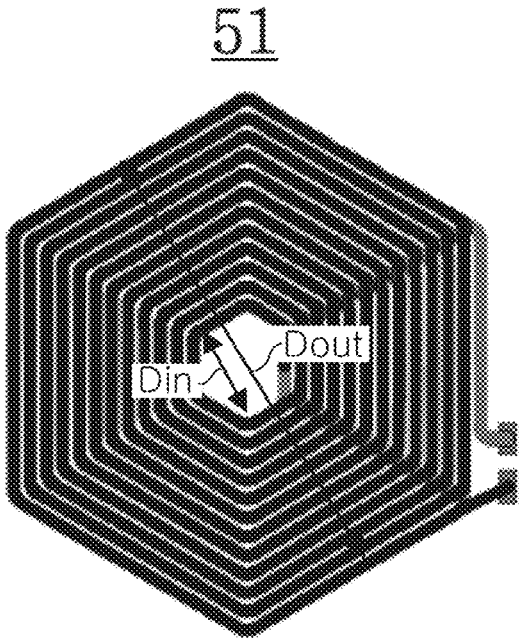
FIG. 15 is a top plan view illustrating one embodiment of a secondary core of the non-contact power-receiving apparatus in accordance with the present invention.

Below, with reference to FIG. 15, a more detailed description will be given of the efficiency of the secondary core 51 of the non-contact power-receiving apparatus 50 in accordance with the present invention.

When the core has an inner diameter Din and an outer diameter Dout, inductance L can be calculated according to current sheet approximation as expressed in Equation 1 below:

$$L=\mu\times n^2\times d_{avg}\times c_1[\ln(c_2/\rho)+c_3\times\rho+c_4\times\rho_2] \quad \text{Equation 1,}$$

where μ is $4\pi\times10^{-7}$, n is a number of turn, $d_{avg}$ is $(d_{out}+d_{in})/2$, ρ is $(d_{out}-d_{in})(d_{out}+d_{in})$, $c_1$ is 1.09, $c_2$ is 2.23, $c_3$ is 0, and $c_4$ is 0.17.

In addition, quality factor Q is calculated according to Equation 2 blow:

$$Q=\omega L/R_{eq} \quad \text{Equation 2,}$$

where ω is 2×π×f, L is inductance, f is frequency, and $R_{eq}$ is equivalent resistance.

While Q value in the Litz core is generally in the range from 20 to 50 as described in Table 3, Q value in the planar-spiral core (i.e., the planar PCB winding core) of the present invention can be low (e.g., 20 or less). The high Q value is caused, at least in part, by a low DCR value. In order to improve the DCR value, a coating layer using PSR ink is formed on a planar PCB core including a Flexible Copper Clad Laminate (FCCL) film. The PSR ink is a coating agent for preventing corrosion as well as ensuring insulation. As a result, the high DCR value causes the low Q value of the present invention.

In other words, in accordance with the present invention, DCR value is lowered to ⅓ by performing electroless plating (e.g., with a thickness of 0.03 μm) on the copper core of the planar PCB core including the FCCL film. As a result, performance is improved when cost is similar.

Furthermore, Table 4 below describes experiment results obtained by adding the shielding section 35 for shielding an induced magnetic field to the above-described planar-spiral power transmission core.

TABLE 4

| Efficiency in Core with Shield | | |
|---|---|---|
| Classification | Single layer planar PCB core | Double layer planar PCB core |
| Q (with Shield) | 12 | 27 |
| Efficiency (@ 2.5 W) | 58% | 67% |

As described in Table 4 above, performance is further improved in the case where the shielding section 35 as shown in FIG. 2 is provided compared to the case where the shielding section is not provided.

In other words, Q is 9 with efficiency 53% as described in Table 3 above when the shielding section is not provided in the single-layer core, whereas Q is 12 with efficiency 58% as described in Table 4 above when the single-layer core has the shielding section.

Likewise, in the case where the planar PCB core has a multi-layer structure, Q is 20 with an efficiency 60% as in Table 3 when the shielding section is not provided, whereas Q is 27 with an efficiency 67% as in Table 4 when the shielding section is provided. Accordingly, it can be appreciated that the performance is improved when the shielding section is provided.

Figure 16:
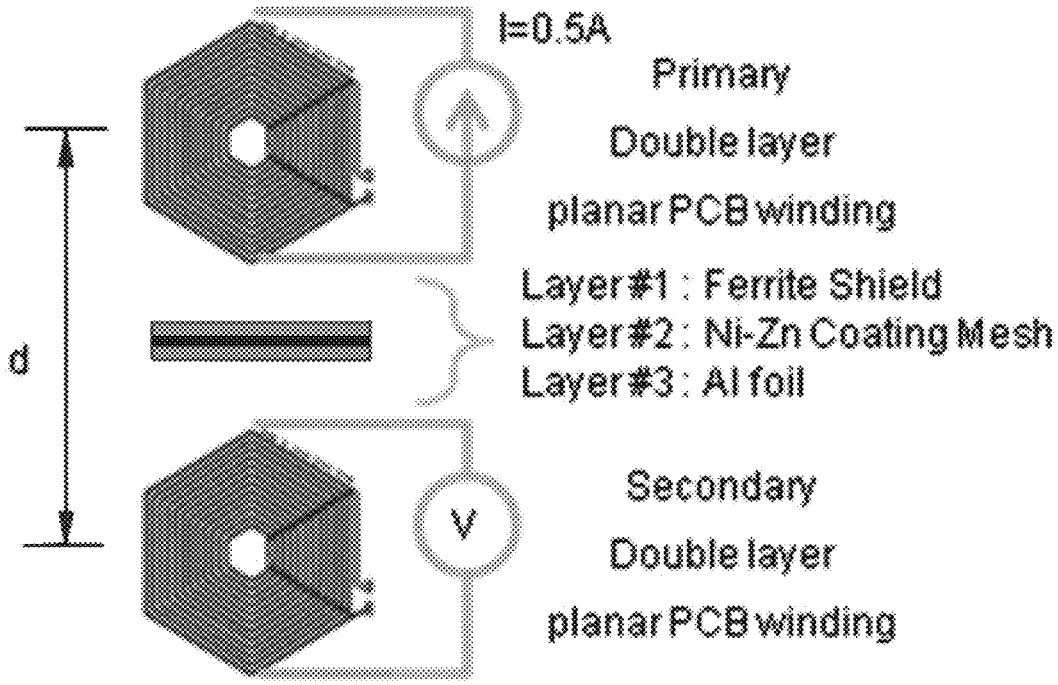
FIG. 16 is a top plan view illustrating a performance test performed on the secondary core of the non-contact power-receiving apparatus in accordance with the present invention.

In order to evaluate the characteristics of the planar-spiral power transmission PCB core of the present invention as shown in FIG. 16, a constant current was allowed to flow through one core to generate an induced magnetic field while a voltage generated by the magnetic field was measured from the other core. (In this test, an interval "d" was for example about 3 mm.)

Here, the Shield Efficiency (SE) of an induced voltage in the case where the shielding section is provided can be expressed by Equation 3 below:

$$SE=20\log_{10}[Vrms(\text{without shield})/Vrms(\text{with 3-layer shield})] \quad \text{Equation 3,}$$

where Vrms (without shield) is an average voltage in the case where the shielding section is not provided, Vrms (with 3-layer shield) is an average voltage in the case where the shielding section is provided, and rms is root mean square.

If an input current is 0.5 A, 170 mV was measured from Vrms (without Shield), but 0.5 mV was measured from Vrms (with 3-layer shield) where the shielding section is provided. Accordingly, the resultant value can be expressed by Equation 4 below:

$$SE=20\log_{10}(170/0.5)=50.62\ (dB) \quad \text{Equation 4}$$

Since 40 dB or more is generally average, the characteristic of about 50 dB explains that the performance was improved owing to the shielding section provided to the core.

As set forth above, the non-contact charging station having the planar-spiral power transmission core and the method for controlling the same in accordance with the present invention have been described.

Below, with reference to FIGS. 13, 17 and 18, a more detailed description will be given of the non-contact power-receiving apparatus 50 having the planar-spiral power transmission core in accordance with the present invention.

Figure 17:
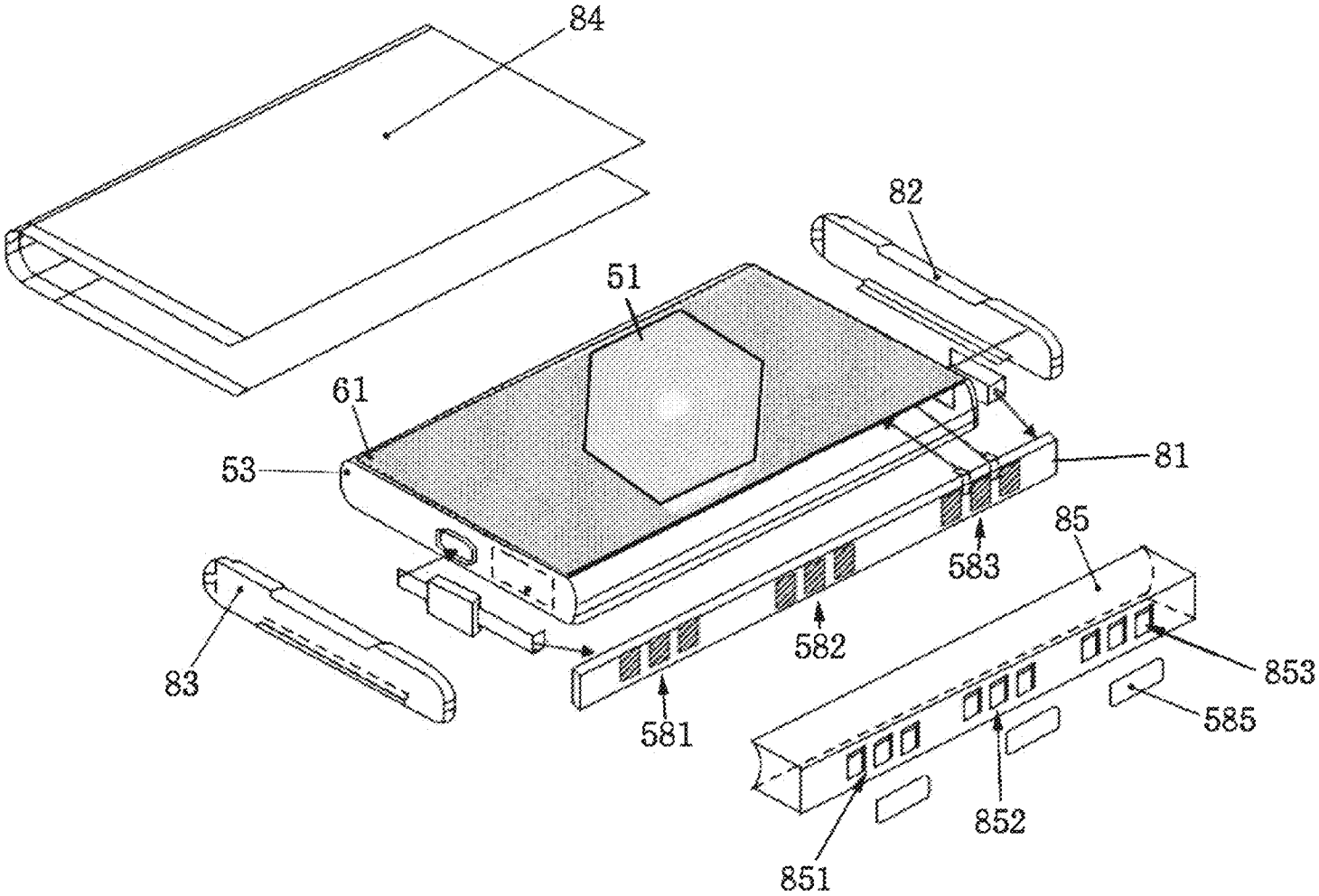
FIGS. 17 and 18 are exploded perspective views illustrating embodiments of the non-contact power-receiving apparatus in accordance with the present invention.
Figure 18:
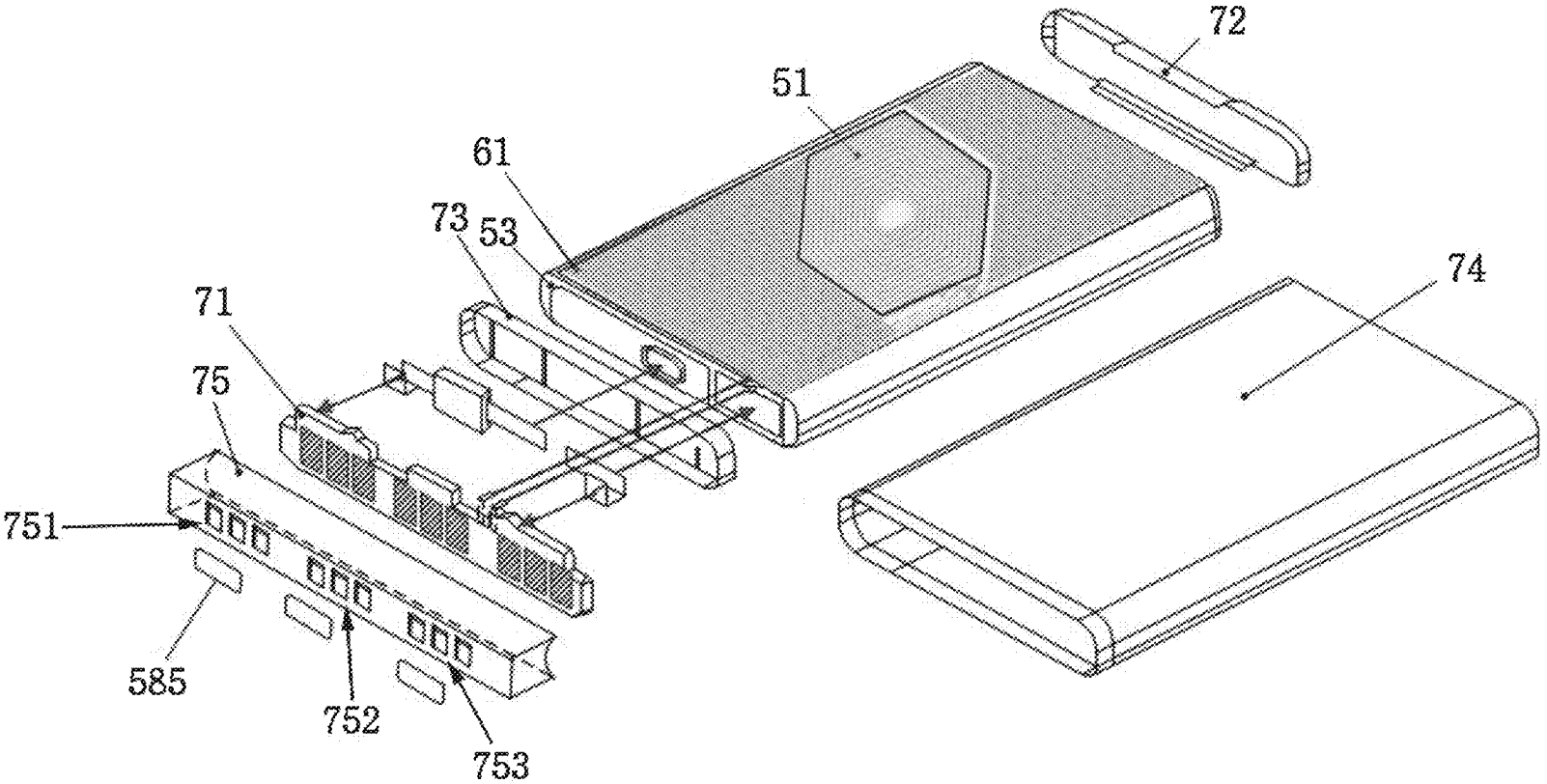

As shown in FIGS. 17 and 18, the non-contact power-receiving apparatus 50 in accordance with the present invention includes a charging PCB 71 or 81 on the front or side edge of the battery cell 53, respectively. Here, the battery pack controller 54 is provided to each of charging PCBs 71 and 81.

The charging PCB 71 on the front edge or the charging PCB 81 on the side edge has a terminal connector assembly 58 supplying electric power to the portable device. The terminal connector assembly 58 comes into contact with a connector of the portable device.

The terminal connector assembly 58 includes a plurality of connectors 581 to 583 (i.e., P+, P− and ID) for supplying electric power from non-contact power-receiving apparatus 50 to the portable device. The connectors perform data signal transmission/receiving function in order to transmit information between the non-contact power-receiving apparatus 50 and the portable device. Thus, detailed data on the degree of charging and power transmission can be transmitted/received through the terminal connectors 58.

Of course, data from the computer C as shown in FIGS. 1 and the like can be transmitted to the portable device by means of the non-contact charging station 10 and the non-contact power-receiving apparatus 50. Accordingly, in addition to the charging operation, data (e.g., upgrade data) can be transmitted through the computer C connectable over the Internet.

In addition, the battery cell 53 is coupled at the rear end with a rear case 72 or 82 and at the front end with a front case 73 or 83. The battery cell 53 is also coupled with an outside case 74 or 84, which surrounds the battery cell 53.

Briefly, the non-contact power-receiving apparatus 50 has the front charging PCB 71 coupled to the front edge of the battery cell 53 or the side charging PCB 81 coupled to the side edge of the battery cell 53.

Accordingly, the front charging PCB 71 coupled to the front end is disposed between the front case 73 and a front PCB case 75 so as to be connected to the connector of the battery cell 53 and thereby to the secondary core 51. In addition, the side charging PCB 81 coupled to the side edge is disposed between the side PCB case 85 coupled to the battery cell 53 so as to be connected to the connector of the battery cell 53 and thereby to the secondary core 51.

Each of the charging PCBs 71 and 81 includes a rectifier block 52 connected with the secondary core 51 to rectify an induced current, a battery pack controller 54 processing data transmitted/received by the secondary core 51, a charging circuit block 55 charging electric power from the rectifier block 52 to the battery cell 53 under the control of the battery packet controller 54, a charge monitor circuit 56 monitoring the level of charge of the battery cell 53 and transmits a signal notifying that the battery cell 53 is fully charged or is discharged to the battery pack controller 54, and the like.

As a result, the induced current generated by the secondary core 51 provided on top of the battery cell 53 is rectified by the rectifier block 52 of the charging PCB 71 or 81, and is then charged through the connector of the battery cell 53 under the control of the battery pack controller 54. Thereby the electric power is supplied to the portable device through the terminal connector assembly 58 by the battery pack controller 54, the charging circuit block 55, and the like.

The terminal connector assembly 58 includes a central connector 582 arranged in the central portion, a left connector 581 arranged in the left from the central connector 582, and a right connector 583 arranged in the right from the central connector 582.

As such, since one non-contact power-receiving apparatus 50 is provided with the left connector 581, the central connector 582, and the right connector 583, the non-contact power-receiving apparatus 50 can be applied to various types of portable devices. According to the position of a power connector of a portable device coupled with the non-contact power-receiving apparatus 50, at least one of the left connector 581, the central connector 582, and the right connector 583 of the terminal connector assembly 58 can come into contact with the power connector of the portable device.

Accordingly, the non-contact power-receiving apparatus 50 can be applied without modification to any type of the portable device M. This as a result increases the range applications where the non-contact power-receiving apparatus can be mounted and improves its applicability.

In particular, since portable devices such as a portable phone, a PDA, a PMP, an MP3 player, and a DMB are provided from a plurality of separate manufacturers, the terminal connectors coming into contact with the non-contact power-receiving apparatus 50 as a respective battery pack can be provided in various forms according to the manufacturers.

The non-contact power-receiving apparatus with the planar-spiral power transmission core in accordance with the present invention includes a variety of connectors such as the left connector 581, the central connector 582, and the right connector 583 so as to be constantly applied to various types of portable devices. Accordingly, the non-contact power-receiving apparatus in accordance with the present invention can be advantageously applied to all types of portable devices.

In addition, left connector holes 751, central connector holes 752, and right connector holes 753 are formed in the front PCB case 75 in positions corresponding to the left connector 581, the central connector 582, and the right connector 583 of the terminal connector assembly 58 of the charging PCB 71 such that the power connector of the portable device is connected to the left connector 581, the central connector 582, or the right connector 583. Likewise, left connector holes 851, central connector holes 852, and right connector holes 853 are formed in the front PCB case 85 in positions corresponding to the left connector 581, the central connector 582, and the right connector 583 of the terminal connector assembly 58 of the charging PCB 71.

Hole covers 585 are coupled with the left connector holes 751 or 851, the central connector holes 752 or 852, and the right connector holes 753 or 853, respectively.

Accordingly, only one of the hole covers 585 of the terminal connector assembly 58 to be used is opened, but the other hole covers which will not be used are configured to be closed maintaining the coupled state. This as a result can prevent impurities or moisture from entering through the unused holes, which would otherwise cause an abnormal operation of the non-contact power-receiving apparatus 50.

Figure 13:
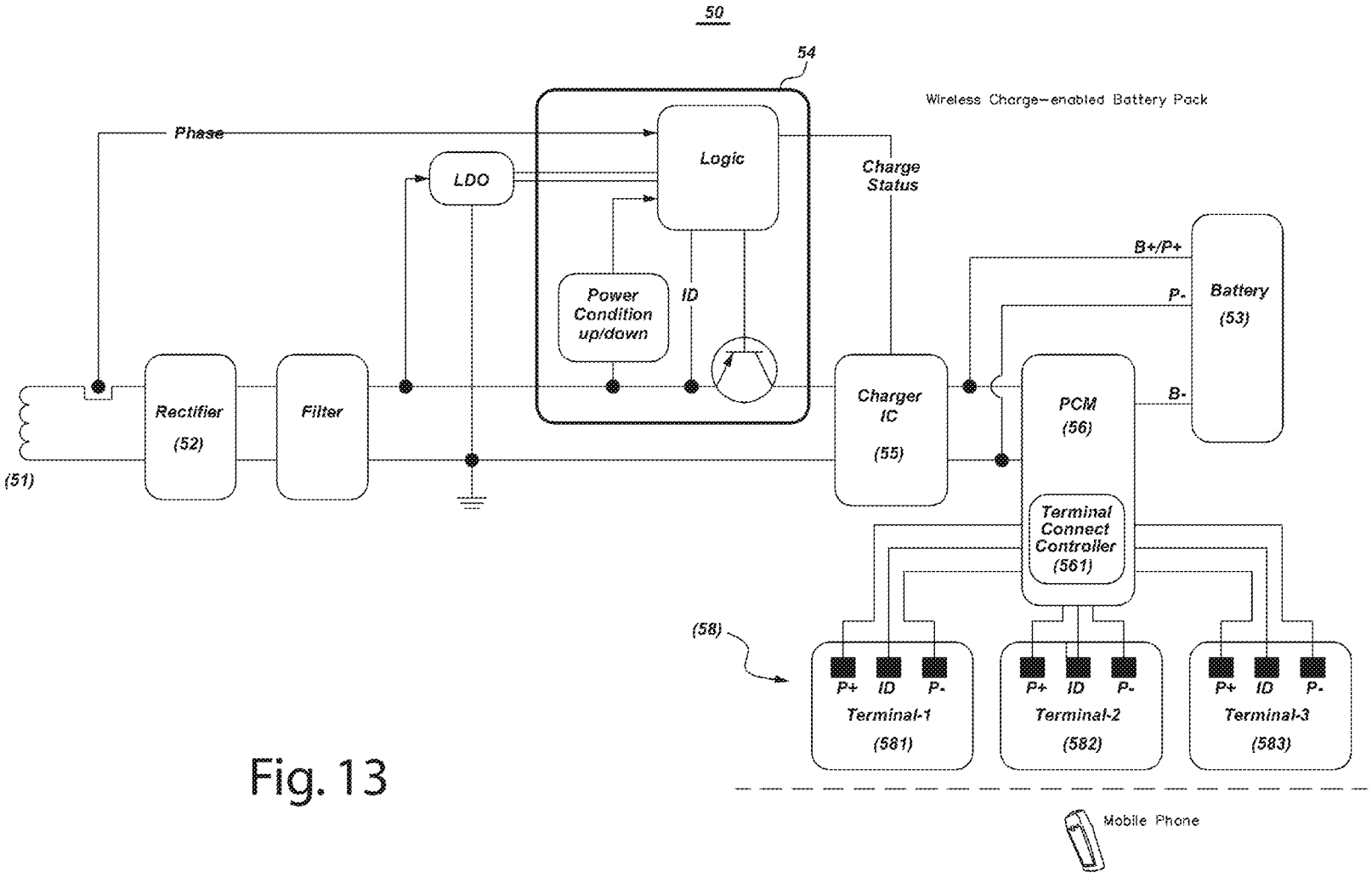
FIG. 13 is a block diagram illustrating another embodiment of the non-contact power-receiving apparatus having a planar-spiral power transmission core in accordance with the present invention.
Figure 14:
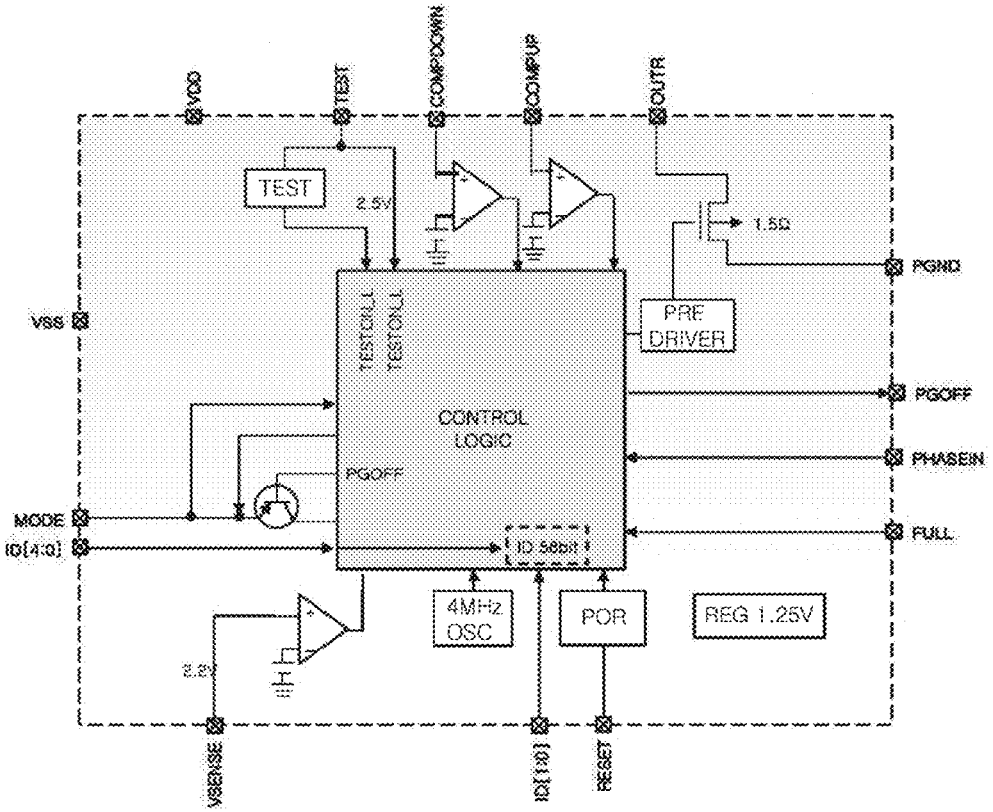
FIG. 14 is a circuit diagram illustrating one embodiment of the battery pack controller shown in FIG. 13.

In addition, as shown in FIG. 13, the charge monitor circuit 56 can have a connector controller 561 that controls electric power to be transmitted to one of the left connector 581, the central connector 582, and the right connector 583 of the terminal connector assembly 58.

In accordance with the present invention, as shown in FIG. 13, the connector controller 561 provided in the charge monitor circuit is illustrated as controlling electric power to be supplied to only one of the left connector 581, the central connector 582, and the right connector 583 corresponding to the power connector of the portable device M. Thus, the hole cover 585 of one of the left connector 581, the central connector 582, and the right connector 583 of the terminal connector assembly 58 corresponding to a power connector (not shown) of the portable device is removed so that the corresponding connector is connected to the power connector of the portable device. Afterwards, when the portable device is coupled with the non-contact power-receiving apparatus 50, the portable device and the non-contact power-receiving apparatus 50 are electrically connected with each other via the connectors.

The battery pack controller 54 then detects the electric connection between the corresponding connectors, and the battery pack controller 54 responsively transmits a switch control signal so that electric power is connected to the corresponding connector via the connector controller 561.

In contrast, the connector controller 561 performs a switching operation under the control of the battery pack controller 54 so that electric power is not connected to the other two connectors.

Accordingly, since the unused connectors are not electrically connected even if impurities are adhered, neither the non-contact power-receiving apparatus 50 nor the portable device is damaged.

The non-contact charging station with a planar-spiral power transmission core, the non-contact power-receiving apparatus, and the method for controlling the same have been described hereinbefore. As set forth above, it is to be appreciated that those skilled in the art can make substitutions, or change or modify the embodiments into various forms without departing from the scope and spirit of the present invention.

Accordingly, the foregoing embodiments should be regarded as illustrative rather than limiting. The scope of the present invention is not defined by the detailed description as set forth above but by the accompanying claims of the invention. It should also be understood that all alterations or modifications derived from the definitions and scopes of the claims and their equivalents fall within the scope of the invention.

The invention claimed is:

1. A non-contact charging station for generating an induced magnetic field toward a non-contact power-receiving apparatus for power charge, the non-contact charging station comprising:

a transmission controller provided inside the non-contact charging station, for controlling power transmission and data transmission;

a station part including a primary core, for generating the induced magnetic field, and placing the non-contact power-receiving apparatus on top thereof, wherein the primary core is configured in a multi-layered structure and includes a single central core in an upper layer and two side cores in a lower layer, wherein the single central core and two side cores transmit first signals respectively to the non-contact power-receiving apparatus in a standby mode;

a received signal processor connected to the primary core to receive, in response to the first signals, at least one response signal indicating received signal intensity of the first signals, from the non-contact power-receiving apparatus; and a shield panel disposed bottom in the primary core, for shielding a magnetic field radiating from the primary core, wherein the central core is placed in a position between the two side cores and is partially overlapped with each of the two side cores, wherein the transmission controller selects, at least one of the central core and the two side cores based on the received signal intensity of the first signals in the standby mode, wherein the transmission controller controls a power signal to be transmitted by the at least one selected core in a charging mode, wherein the non-contact charging station receives a second signal including information regarding a degree of voltage calibration for the power signal from the non-contact power-receiving apparatus in the charging mode, transmits a compensated power signal according to the signal including the information regarding the degree of voltage calibration for the power signal to the non-contact power-receiving apparatus in the charging mode, and stops the power transmission if it is detected that a metallic body other than the non-contact power-receiving apparatus is placed on the station part, and wherein the at least one selected core has the best received signal intensity among the single central core and the two side cores.

2. The non-contact charging station according to claim 1, further comprising:

a spacer disposed between the central core and the two side cores so as to allow the central core to be disposed apart from the two side cores.

3. The non-contact charging station according to claim 1, wherein at least one of the central core and the two side cores includes:

a core base; and an inductance pattern core formed at the core base and having a planar-spiral structure.

4. The non-contact charging station according to claim 3, wherein the inductance pattern core is made of copper, and wherein at least one of the central core and the two side cores further includes a photosensitive solder resist layer or an electro-less plating layer formed on the inductance pattern core.

5. The non-contact charging station according to claim 1, further comprising a state controller block configured to switch between each of the central core and the two side cores under the control of the transmission controller.

6. The non-contact charging station according to claim 5, further comprising:

a power supply part which supplies an electric power to a resonant converter;

a resonant converter allowing the electric power from the power supply part to be supplied to the central core and the two side cores; and a switching part having a first switch and a second switch, wherein a first switch is disposed between the resonant converter and the central core and the second switch is disposed between the resonant converter and the two side cores.

7. The non-contact charging station according to claim 6, further comprising:

a state controller block which controls the switching part such that the second switch is switched off when a secondary core of the non-contact power-receiving apparatus is disposed within the area of the central core.

8. The non-contact charging station according to claim 1, wherein the shield panel has a mesh made of polyester and an eddy-current reducing composition coated with the mesh.

9. A method of controlling a non-contact charging station, the method comprising:

transmitting, at a primary core comprising a single central core and two side cores, first signals respectively to the non-contact power-receiving apparatus in a standby mode;

receiving, in response to the first signals, at least one response signal indicating received signal intensity of the first signals from the non-contact power-receiving apparatus in the standby mode;

selecting, based on the received signal intensity of the first signals, at least one of the single central core and the two side cores in the standby mode;

allowing the at least one selected core to transmit a power signal to the non-contact power-receiving apparatus;

receiving a second signal including information regarding a degree of voltage calibration for the power signal from the non-contact power-receiving apparatus in a charging mode; and transmitting a compensated power signal according to the information regarding the degree of voltage calibration for the power signal to the non-contact power-receiving apparatus in the charging mode, wherein a primary core comprises the single central core and the two side cores, wherein the central core is placed in a position between the two side cores and is partially overlapped with each of the two side cores, wherein a shield panel disposed bottom in the primary core, for shielding a magnetic field radiating from the primary core, wherein the power transmission is stopped if it is detected that a metallic body other than the non-contact power-receiving apparatus is placed on the station part, and wherein the at least one selected core has the best received signal intensity among the single central core and the two side cores.

*10. A non-contact power-receiving apparatus for receiving power signals from a non-contact power-charging apparatus for wireless power transfer, the non-contact power-receiving apparatus comprising:*

*a secondary core that (i) receives one or more power signals and (ii) sends communication signals, wherein the secondary core includes a shielding section configured to shield other electronic components of the non-contact power-receiving apparatus from power signals of the non-contact power-charging apparatus;*

*a rectifier block coupled to the secondary core that converts the one or more power signals into a rectified power; and*

*a controller coupled to the rectified block which is configured to:*

*in response to the one or more power signals received at the secondary core from one or more corresponding power transmission cores, generate at least one detection signal, which indicates an intensity of at least one of the one or more power signals, for transmission by the secondary core to enable the non-contact power-charging apparatus to select an appropriate power transmission core for further transmission of the one or more power signals;*

*after conversion of the one or more power signals received from the selected appropriate power transmission core into a rectified power by the rectifier block control transfer of the rectified power to a battery;*

*generate at least one control signal for transmission by the secondary core to the non-contact power-charging apparatus to control a voltage of the one or more power signals relative to a reference level;*

*determine that a metal object other than the non-contact power-receiving apparatus is placed near the selected power transmission core; and*

*generate an end power transfer signal, for transmission by the secondary core to the non-contact power-*

*charging apparatus, to stop the transmission of the one or more power signals.*

*11. The apparatus of claim 10, wherein one or more of (i) the at least one detection signal and (ii) the at least one control signal includes a unique ID of the non-contact power receiving apparatus.*

*12. The apparatus of claim 10, wherein the controller is further configured to, responsive to receipt of one or more power signals having power determined to be different from a reference level, send a signal including a unique ID of the non-contact power receiving apparatus.*

*13. The apparatus of claim 10, wherein the selected power transmission core was selected based on the at least one detection signal by a transmission controller communicatively coupled to the corresponding selected power transmission core.*

*14. The apparatus of claim 10, wherein the secondary core comprises a planar-spiral core.*

*15. The apparatus of claim 10, further comprising a battery, the battery being charged using the rectified power under the control of the controller.*

*16. The apparatus of claim 10, wherein the controller is further configured to generate the control signal to cause the non-contact power-charging apparatus to modify the signal when the rectified power is determined to be either (i) below a first predetermined threshold relative to the reference level or (ii) above a second predetermined threshold relative to the reference level.*

*17. The apparatus of claim 16, wherein the control signal includes an indication to either (i) raise or (ii) lower the power signal.*

*18. The apparatus of claim 10, wherein controller comprises a battery pack controller.*

*19. A method of controlling a non-contact power-receiving station comprising:*

*receiving, at a secondary core, a plurality of power signals applied to the secondary core, each of the power signals coming from a corresponding power transmission core, wherein the secondary core includes a shielding section configured to shield other electronic components of the non-contact power-receiving station from power signals of a non-contact power-charging apparatus;*

*generating at least one detection signal indicating an intensity of at least one of the plurality of power signals for transmission by the secondary core to enable the non-contact power-charging apparatus to select an appropriate power transmission core for further transmission of a power signal;*

*converting a power signal received on the secondary core from the selected appropriate power transmission core into a rectified power;*

*controlling transfer of the rectified power to a battery;*

*generating a control signal for transmission by the secondary core to the selected appropriate power transmission core to control a voltage of the power signal when the rectified power relative to a reference level;*

*determining that a metal object other than the non-contact power-receiving apparatus is placed near the selected power transmission core; and*

*generating an end power transfer signal, for transmission by the secondary core to the non-contact power-charging apparatus, to stop the transmission of the one or more power signals.*

*20. The method of claim 19, wherein one or more of (i) the at least one detection signal and (ii) the control signal includes a unique ID of the non-contact power receiving apparatus.*

*21. The method of claim 19, wherein the secondary core comprises a planar-spiral core.*

*22. The method of claim 19, further comprising monitoring charging of the battery and transmitting charge state information to the non-contact power-charging station.*

*23. The method of claim 19, further comprising generating the control signal to cause the non-contact power-charging apparatus to modify the signal when the rectified power is determined to be either (i) below a first predetermined threshold relative to the reference level or (ii) above a second predetermined threshold relative to the reference level.*

*24. The method of claim 19, further wherein the control signal comprises an indication to either (i) raise or (ii) lower the power signal.*

* * * * *